US010764886B2

(12) United States Patent
Li et al.

(10) Patent No.: US 10,764,886 B2
(45) **Date of Patent: *Sep. 1, 2020**

(54) DATA TRANSMISSION METHOD, WIRELESS NETWORK DEVICE, AND COMMUNICATIONS SYSTEM

(71) Applicant: HUAWEI TECHNOLOGIES CO., LTD., Shenzhen (CN)

(72) Inventors: Yuanjie Li, Shanghai (CN); Ting Wang, Shanghai (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,476

(22) Filed: Jan. 5, 2018

(65) Prior Publication Data

US 2018/0146465 A1 May 24, 2018

Related U.S. Application Data

(63) Continuation of application No. PCT/CN2015/083388, filed on Jul. 6, 2015.

(51) Int. Cl.
*H04W 4/00* (2018.01)
*H04W 72/04* (2009.01)
(Continued)

(52) U.S. Cl.
CPC ......... *H04W 72/044* (2013.01); *H04L 5/0007* (2013.01); *H04L 5/0044* (2013.01);
(Continued)

(58) Field of Classification Search
CPC ..... H04L 5/001; H04L 5/0023; H04L 5/0035; H04L 5/0073; H04L 27/2662;
(Continued)

(56) References Cited

U.S. PATENT DOCUMENTS

| | | | | |
|---|---|---|---|---|
| 8,774,101 B2 | 7/2014 | Lim et al. | | |
| 2005/0058229 A1* | 3/2005 | Alagha | H04B 7/18523 375/346 | |

(Continued)

FOREIGN PATENT DOCUMENTS

| | | |
|---|---|---|
| CN | 101175297 A | 5/2008 |
| CN | 101345988 A | 1/2009 |

(Continued)

OTHER PUBLICATIONS

"3rd Generation Partnership Project; Technical Specification Group Radio Access Network; Evolved Universal Terrestrial Radio Access (E-UTRA); Physical channels and modulation(Release 12)," 3GPP TS 36.211 V12.6.0, 3rd Generation Partnership Project, Valbonne, France (Jun. 2015).

(Continued)

*Primary Examiner* — Abdelnabi O Musa
(74) *Attorney, Agent, or Firm* — Leydig, Voit & Mayer, Ltd.

(57) ABSTRACT

A data transmission method, a wireless network device, and a communications system are provided. The method includes: sending, by a first wireless network device, at least two channels for common information on a same carrier, where the at least two channels for common information include a first channel for common information and a second channel for common information, the first channel for common information and the second channel for common information are on different subbands of the same carrier, and the common information includes at least one of a synchronization signal, a broadcast signal, or a system message.

18 Claims, 11 Drawing Sheets

Another service UE
D2D UE
eNB
Multicast service UE
MTC UE
Unicast service UE

(51) Int. Cl.
*H04L 5/00* (2006.01)
*H04L 27/26* (2006.01)

(52) U.S. Cl.
CPC ........ *H04L 5/0053* (2013.01); *H04L 27/2605* (2013.01); *H04W 72/04* (2013.01)

(58) Field of Classification Search
CPC . H04L 27/2655; H04L 27/2657; H04L 5/007; H04L 5/0044; H04W 72/044; H04W 72/0453; H04W 56/00; H04W 72/04; H04J 2011/0096; H04J 2013/0096
See application file for complete search history.

(56) References Cited

U.S. PATENT DOCUMENTS

2008/0080463 A1 4/2008 Stewart et al.
2008/0130570 A1 6/2008 Jung et al.
2008/0165743 A1 7/2008 Palanki et al.
2010/0260156 A1* 10/2010 Lee ................... H04W 56/0035 370/336
2011/0188441 A1* 8/2011 Kim ...................... H04L 5/0044 370/312
2011/0280294 A1* 11/2011 Luo ..................... H04L 25/0204 375/224
2012/0106432 A1* 5/2012 Lee .................... H04B 7/15528 370/315
2012/0307726 A1* 12/2012 Pi ......................... H04J 11/0069 370/328
2013/0039331 A1* 2/2013 Koorapaty .............. H04L 5/001 370/330
2013/0235851 A1* 9/2013 Abu-Surra ............ H04W 56/00 370/336
2013/0242951 A1 9/2013 Lee et al.
2014/0307729 A1* 10/2014 Son ...................... H04J 11/0056 370/350
2015/0085803 A1 3/2015 Hu et al.
2015/0181546 A1 6/2015 Freda et al.
2015/0282132 A1* 10/2015 Kim ...................... H04W 8/005 370/329
2017/0272322 A1 9/2017 You et al.

FOREIGN PATENT DOCUMENTS

CN 101820601 A 9/2010
CN 102440025 A 5/2012
CN 103458386 A 12/2013
EP 2564611 B1 2/2015
JP 2010041581 A 2/2010
KR 20080048293 A 6/2008
KR 20090058539 A 6/2009
WO 2014139562 A1 9/2014
WO 2016130175 A1 8/2016

OTHER PUBLICATIONS

"3rd Generation Partnership Project; Technical Specification Group Radio Access Network; Evolved Universal Terrestrial Radio Access (E-UTRA); Physical layer procedures(Release 12)," 3GPP TS 36.213 V12.6.0, 3rd Generation Partnership Project, Valbonne, France (Jun. 2015).
CB 201580081516.6, Office Action, dated Jul. 2, 2019.
KR/10-2018-7002454, Office Action, dated Sep. 27, 2019.
U.S. Appl. No. 16/225,908, filed Dec. 19, 2018.

* cited by examiner

DATA TRANSMISSION METHOD, WIRELESS NETWORK DEVICE, AND COMMUNICATIONS SYSTEM

CROSS-REFERENCE TO RELATED APPLICATIONS

This application is a continuation of International Application No. PCT/CN2015/083388, filed on Jul. 6, 2015, which is incorporated herein by reference in its entirety.

TECHNICAL FIELD

The present disclosure relates to the field of communications technologies, and in particular, to a data transmission method, a wireless network device, and a communications system.

BACKGROUND

As wireless communication requirements grow, a network service includes various types of services, such as a Voice over Internet Protocol (IP) service, a high-definition video transmission service, a machine type communication (MTC) service with high coverage and a low data volume, a delay-sensitive service, an enhanced multimedia broadcast/multicast (eMBMS) service, and a device-to-device (D2D) transmission service. The term "voice over IP" may be referred as VoIP.

A current common solution is to send various types of services on different carriers or in different subframes of a same carrier, which results in a relatively low carrier utilization. A service transmission solution and a corresponding common information transmission solution are urgently needed to improve carrier utilization.

SUMMARY

Embodiments of the present disclosure provide a frame structure used for wireless communications, a data transmission method, an apparatus, and a communications system, which are applicable to a service transmission scenario in which carrier utilization is relatively high. Different services may be transmitted on different subbands of a same carrier in the service transmission scenario in which the carrier utilization is relatively high.

According to a first aspect, a frame structure used for wireless communications may include: at least two channels for common information are included in a same carrier, where the at least two channels for common information include a first channel for common information and a second channel for common information, and the first channel for common information and the second channel for common information are on different subbands of the same carrier.

According to a second aspect, a data transmission method is provided. In the method, a wireless network device sends and/or receives data according to the frame structure in any one of the first aspect, or the first to the ninth possible implementations of the first aspect, and the data includes common information and/or a service.

According to a third aspect, a wireless network device is provided. The wireless network device includes a transceiver unit and a processing unit, and the processing unit executes the method provided in the second aspect, and in an execution process, uses the transceiver unit to send and/or receive data.

According to a fifth aspect, a wireless network device is provided. For example, the wireless network device includes a transceiver unit and a processing unit, the processing unit is configured to execute the method provided in any one of the fourth aspect, or the first to the seventeenth possible implementations of the fourth aspect, and under control of the processing unit, the transceiver unit receives and/or sends data.

According to a sixth aspect, a data transmission method may include: receiving, by a second wireless network device, a second channel for common information according to a feature of a second service that needs to be received, where the second channel for common information is corresponding to the second service, and the feature of the second service includes a frame structure of the second service, a type of the second service, or a type of the second wireless network device.

With reference to the sixth aspect, in a first possible implementation of the sixth aspect, that the second channel for common information is corresponding to the second service includes: the second channel for common information is corresponding to the frame structure of the second service, the type of the second service, or the type of the second wireless network device.

According to a seventh aspect, a wireless network device may include a transceiver unit and a processing unit. The processing unit is configured to execute the method provided in any one of the sixth aspect, or the first to the thirteenth possible implementations of the sixth aspect, and under control of the processing unit, the transceiver unit receives and/or sends data.

According to an eighth aspect, an embodiment of the present disclosure provides a communications system, and the system includes the wireless network device provided in any one of the fifth aspect or the possible implementations of the fifth aspect and the wireless network device provided in any one of the seventh aspect or the possible implementations of the seventh aspect.

BRIEF DESCRIPTION OF DRAWINGS

To describe technical solutions in embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
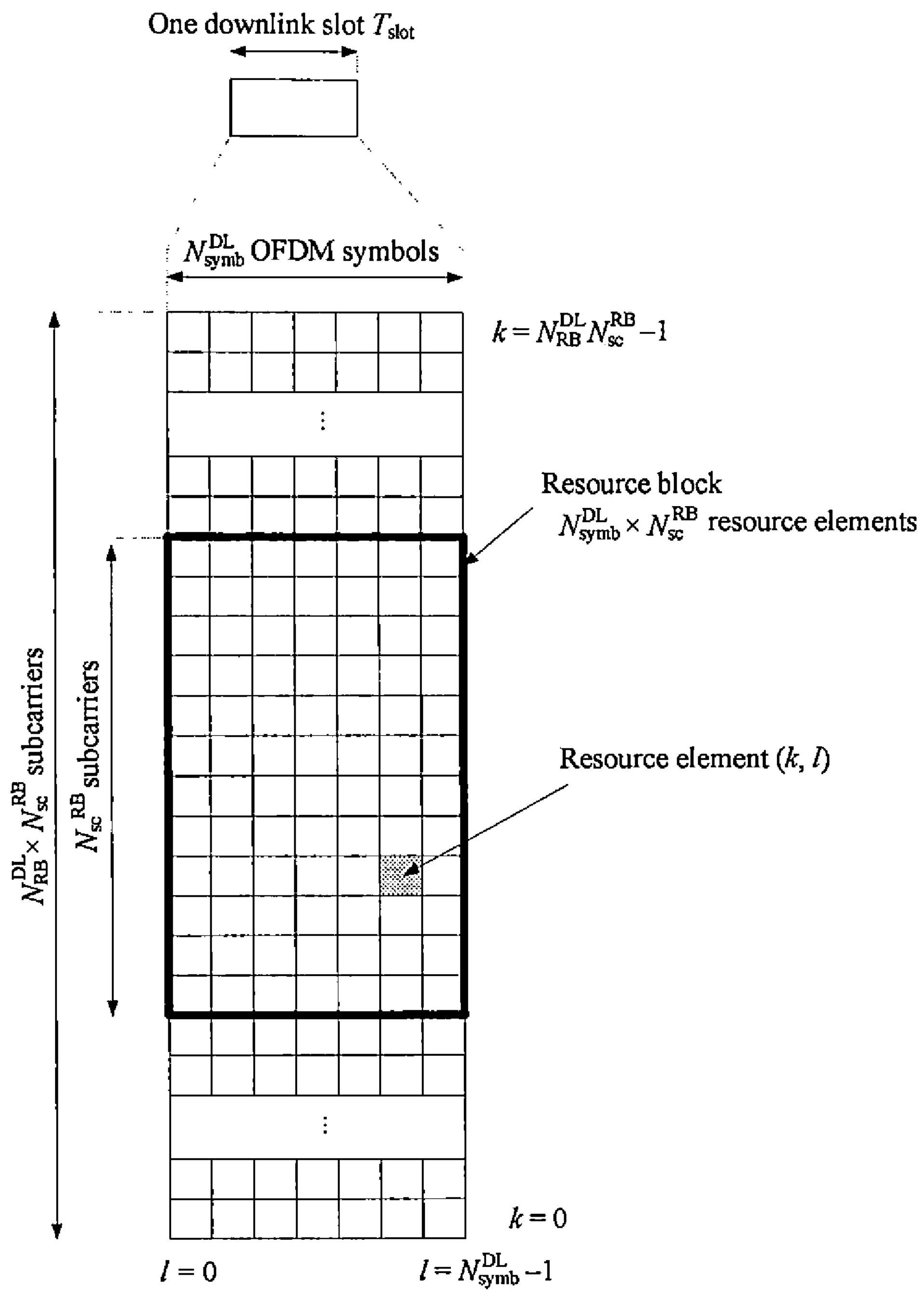
FIG. 1 is a schematic structural diagram of a resource grid in an OFDM system according to an aspect of the present disclosure.

The following describes technical solutions in embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

According to the frame structure used for wireless communications, the data transmission method, the apparatus, and the communications system that are provided in the embodiments of the present disclosure, different channels for common information are transmitted on different subbands on a same carrier, to effectively transmit common information in a scenario in which multiple services are transmitted on a same carrier.

To facilitate understanding, examples of some concepts related to the present disclosure are described for reference, and are shown as follows:

The 3$^{rd}$ Generation Partnership Project (3GPP) is a project devoted to developing a wireless communications network. Institutions related to the 3GPP are generally referred to as 3GPP institutions.

A wireless communications network is a network that provides a wireless communications function. Different communications technologies may be used in the wireless communications network, for example, Code Division Multiple Access (CDMA), Wideband Code Division Multiple Access (WCDMA), Time Division Multiple Access (TDMA), Frequency Division Multiple Access (FDMA), orthogonal frequency division multiple access (OFDMA), single carrier frequency division multiple access (SC-FDMA), and carrier sense multiple access with collision avoidance (carrier sense multiple access with collision avoidance). Networks may be classified into a 2G (generation) network, a 3G network, or a 4G network according to factors such as capacities, speeds, and delays of different networks. A typical 2G network includes a Global System for Mobile Communications (GSM) network or a general packet radio service (GPRS) network. A typical 3G network includes a Universal Mobile Telecommunications System (UMTS) network. A typical 4G network includes a Long Term Evolution (LTE) network. The UMTS network may sometimes be referred to as a universal terrestrial radio access network (UTRAN). The LTE network may sometimes be referred to as an evolved universal terrestrial radio access network (E-UTRAN). Networks may be classified into a cellular communications network and a wireless local area network (WLAN) according to different resource allocation manners. The cellular communications network is scheduling-dominant. The WLAN is contention-dominant. All of the 2G; 3G and 4G networks are cellular communications networks. Persons skilled in the art should know that, with development of technologies, the technical solutions provided in the embodiments of the present disclosure may also be applied to another wireless communications network such as a 4.5 G or 5G network, or to another non-cellular communications network. For brevity, the wireless communications network sometimes is briefly referred to as a network in the embodiments of the present disclosure.

A cellular communications network is a type of wireless communications network. In a cellular wireless networking manner, a terminal device and a network device are connected by using a wireless channel, so that users can communicate with each other in activity. The cellular communications network has a main feature of terminal mobility, and has a handover function and a function of automatic roaming across a local network.

A wireless network device is a device in a wireless communications network. The wireless network device may be a terminal such as user equipment, or may be a network side device such as a base station, a network controller, or a mobile switching center. The terminal may perform communication with the network side device, or may perform communication with another terminal, for example, communication in a D2D or M2M scenario. The network side device may perform communication with the terminal, or may perform communication with another network side device, for example, communication between a macro base station and an access point.

User equipment (UE) is a terminal device, and may be a mobile terminal device or an immobile terminal device. The device is mainly configured to receive or send service data. The user equipment may be distributed in a network. The user equipment has different names in different networks, for example, a terminal, a mobile station, a subscriber unit, a station, a cellular phone, a personal digital assistant, a wireless modem, a wireless communications device, a handheld device, a laptop computer, a cordless telephone, and a wireless local loop station. The user equipment may communicate with one or more core networks via a radio access network (RAN) (an access part of a wireless communications network), for example, exchange voice and/or data with the radio access network.

A base station (BS) device, which may also be referred to as a base station, is an apparatus that is deployed in a radio access network to provide a wireless communications function. For example, in a 2G network, a device that provides a base station function includes a base transceiver station (base transceiver station, BTS) and a base station controller (BSC). In a 3G network, a device that provides a base station function includes a NodeB (NodeB) and a radio network controller (RNC). In a 4G network, a device that provides a base station function includes an E-UTRAN NodeB (evolved NodeB, eNB). In a WLAN, a device that provides a base station function is an access point (AP).

The Internet Protocol (IP) is a protocol that is designed to interconnect computer networks for communication. On the Internet, the Internet Protocol is a set of rules that enable all computer networks connected to the network to communicate with each other, and it is specified that, that computers communicate on the Internet is a rule that should be observed.

A wireless local area network (wireless local area networks, WLAN) is a local area network in which a radio wave is used as a data transfer medium, and a transfer distance is generally only several decameters.

An access point (AP) is connected to a wireless network, and may also be connected to a wired network device. The access point can be used as an intermediate point, so that devices connected to a network in a wired manner and in a wireless manner are interconnected and transmit data to each other.

A system information broadcast: may be briefly referred to as system information, and mainly provide main information of a network that is accessed, so as to establish a wireless connection to UE, so that the UE obtains sufficient access information, such as a common configuration parameter for cell selection/reselection. A system message in LTE is divided into multiple system message blocks (SIB). One of the blocks is referred to as a master broadcast block (MIB). The MIB is also referred to as a broadcast signal. Another SIB is referred to as a system message. An LTE system information broadcast and a 3G system information broadcast are completely consistent in a function, but are significantly different in scheduling and specific information content. The MIB usually includes a limited quantity of most important and most commonly-used transmission parameters. The another SIB usually includes a cell radio configuration, cell reselection information, a neighboring cell list, a home eNodeB identifier (home eNB identifier), notification information such as earthquake and tsunami warning (ETWS) or a common alert (CMAS), and a parameter such as multimedia broadcast/multicast (MBMS) control information.

A time sequence is a sequence of time.

A synchronization signal is a signal that is used by a receiver to implement at least one of frequency synchronization or time synchronization with a sender.

Access is a process of establishing an initial connection between wireless network devices. Specifically, the wireless network device may be not limited to a specific device. The access is usually used between UE and a base station or between a micro base station and a macro base station, or is used between UE and UE in the embodiments of the present disclosure.

Figure 11:
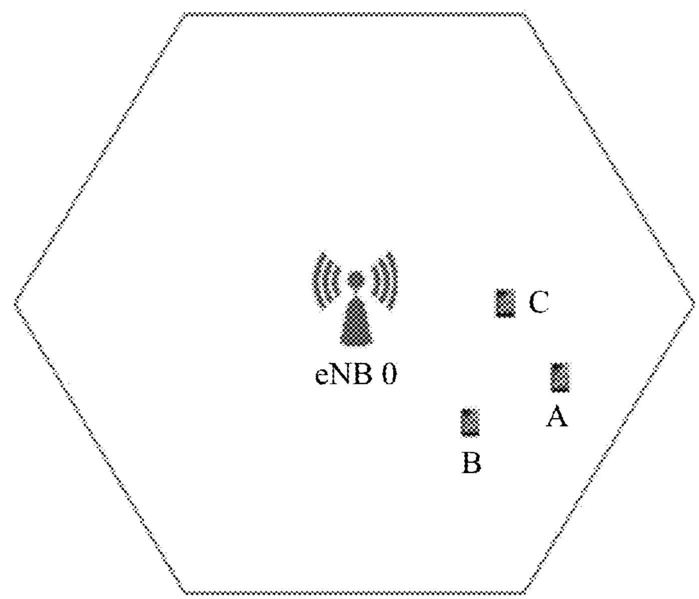
FIG. 11 is a schematic diagram in which there are three UEs in communication with an eNB according to an aspect of the present disclosure.
Figure 16:
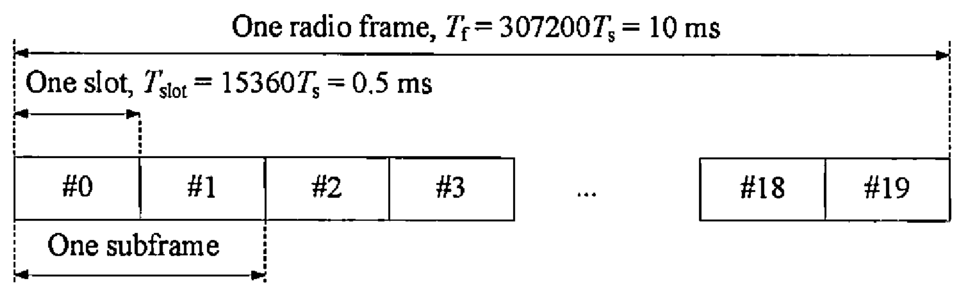
FIG. 16 is a schematic diagram of a frame structure in an LTE network according to an aspect of the present disclosure.

FIG. 16 is a schematic diagram of a frame structure in an LTE network according to an aspect of the present disclosure. A frame structure, a radio frame, a subframe, a timeslot, and a symbol are as follows:

The frame structure is a structure presented when a time domain resource (time domain) for signal transmission is divided. In wireless communications, time units commonly used in the frame structure are successively a radio frame, a subframe, and a timeslot in descending order. A specific time length corresponding to each time unit may be specified according to a specific protocol requirement. A frame structure in LTE is used as an example. A radio frame has a length of 10 ms, and includes 10 subframes. A length of each subframe is 1 ms. Each subframe further includes two timeslots. Each timeslot (slot) is 0.5 ms. The symbol (symbol) is a smallest unit of a signal in a time domain. An LTE network is used as an example. As shown in FIG. 11, each OFDM subcarrier is corresponding to an OFDM symbol. When an intersymbol guard interval is not considered, an OFDM symbol length (an occupied time) is 1/subcarrier spacing. When an intersymbol guard interval is considered, a time occupied by an OFDM symbol is a sum of an OFDM symbol length and a cyclic prefix (CP) length.

Cyclic Prefix (CP):

In an OFDM system, to cancel intersymbol interference to the greatest extent, a guard interval needs to be inserted between OFDM symbols. A length Tg of the guard interval is generally greater than a maximum delay spread of a wireless channel, so that a multipath component of a symbol causes no interference in a next symbol.

Within the guard interval, no signal may be inserted, that is, the guard interval is an idle transmission time period. However, in this case, inter-channel interference is caused due to impact of multipath propagation, that is, orthogonality between subcarriers is damaged, and interference is consequently caused between different subcarriers. To cancel the inter-channel interference caused by the multipath propagation, period extension is performed on an OFDM symbol whose original width is T, and the guard interval is filled by using an extension signal.

A frame number is a number of each radio frame. An LTE network is used as an example. Numbers of frames in the LTE are 0 to 1023, and then frames are numbered from 0 again.

A resource includes at least one of a time domain resource, a frequency domain resource, a codeword resource, or a spatial resource.

A time domain resource is a resource that is occupied by a signal and that is measured in time. For example, the signal occupies two OFDM symbols, one subframe, or three radio frames in time. The time domain resource may include an absolute time domain resource and a relative time domain resource. The relative time domain resource may be but is not limited to at least one of a radio frame number, a relative location of a subframe in a radio frame, or a relative location of a symbol in a subframe. The time domain resource is usually described as fixed or variable for the relative time domain resource. That the time domain resources are usually described as the same may be that the absolute time domain resources are the same, or that the relative time domain resources are the same.

A frequency domain resource is a resource that is occupied by a signal and that is measured in frequency. For example, the signal occupies 10 MHz in frequency. In an OFDM system, an occupied frequency domain resource is usually described by using a subcarrier quantity.

A time-frequency resource is a resource that is occupied by a signal and that is measured in time and frequency. For example, the signal occupies two OFDM symbols in time, and occupies 10 MHz in frequency.

A codeword resource is a resource that is occupied by a signal and that is measured in a code, for example, a spreading code in WCDMA. Alternatively, a sequence resource used for a signal is also referred to as a codeword resource, for example, a sequence used for a synchronization signal.

A sequence is a type of codeword resource.

A spatial resource is a resource that is occupied by a signal and that is measured in a beam. For multiple input multiple output (MIMO) transmission, a signal may be transmitted in parallel on a same time-frequency resource by using different-direction beams.

A frame structure of a service includes a subcarrier spacing, a CP length, a frequency domain resource, and a time domain resource that are used when service data is transmitted, where the frequency domain resource and the time domain resource are occupied by the service. In an FDD system, a frame structure of a service includes at least a subcarrier spacing, a CP length, and a subband on which the service is located that are used when service data is transmitted.

A structure of a channel includes a subcarrier spacing, a CP length, a time domain resource, and a frequency domain resource that are used when the channel is transmitted. In an FDD system, a structure of a channel includes at least a subcarrier spacing, a CP length, and a subband on which the channel is located that are used when the channel is transmitted.

A basic channel for common information may be a type of channel for common information predefined in a system or a protocol, for example, a legacy synchronization channel in LTE. Alternatively, a service type is predefined, and a channel for common information corresponding to the service type is a basic channel for common information.

A carrier consists of a consecutive frequency domain resource on a spectrum, and a bandwidth of the carrier is a system bandwidth. For example, system bandwidths that can be currently supported by LTE are 1.4 MHz, 3 MHz, 5 MHz, 10 MHz, 15 MHz, and 20 MHz.

Subband: The resource on the foregoing carrier is further divided, and each consecutive frequency domain resource obtained by means of division is referred to as a subband of the carrier.

Terms such as “component”, “module”, and “system” used in this application are used to indicate computer-related entities. The computer-related entities may be hardware, firmware, combinations of hardware and software, software, or software in running. For example, a component may be, but is not limited to, a process that runs on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network such as the Internet by using a signal).

All aspects are described in this application with reference to a wireless network device. The wireless network device may be a base station, or may be a terminal such as user equipment. The user equipment may also be referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless telephone, a Session Initiation Protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device that is configured to communicate in a wireless system. The base station may also be referred to as an access point, a node, a NodeB, an E-UTRAN NodeB (eNB), or another network entity, and may include some or all functions of the foregoing network entities. The base station may communicate with a wireless terminal by using an air interface. The communication may be performed by using one or more sectors. The base station may convert a received air interface frame into an IP packet and serve as a router between the wireless terminal and a remaining portion of an access network. The access network includes an Internet Protocol (IP) network. In addition, the base station may coordinate air interface attribute management, and may be a gateway between a wired network and a wireless network.

All aspects, embodiments, or features are presented in this application by describing a system that may include multiple devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, in the present disclosure, the word “example” is used to represent giving an example, an illustration, or a description. Any embodiment or design scheme described as an “example” in this application should not be explained as being more preferred or having more advantages than another embodiment or design scheme. Exactly, use of the word “example” is intended to present a concept in a specific manner.

The disclosed embodiments may be combined into a communications system. In an example, orthogonal frequency division multiplexing (OFDM) is used in the communications system. An entire system bandwidth is effectively divided into multiple subcarriers by using the OFDM. The subcarriers are also referred to as frequency subchannels, tones, or frequency bands.

A network architecture and a service scenario described in the embodiments of the present disclosure intend to describe the technical solutions in the embodiments of the present disclosure more clearly, and do not constitute a limitation on the technical solutions provided in the embodiments of the present disclosure. Persons of ordinary skill in the art may understand that, with evolution of a network architecture and emergence of a new service scenario, the technical solutions provided in the embodiments of the present disclosure are also applicable to similar technical problems.

The following provides description by using a scenario of a 4G network in wireless communications networks as an example.

An OFDM technology is used in an LTE network. OFDM is a multicarrier transmission manner, and multiplexed signals (subcarriers) are orthogonal. In the OFDM technology, a high-speed data stream is converted into multiple parallel low-speed data streams by means of serial/parallel conversion, and then the multiple parallel low-speed data streams are allocated to subchannels on several subcarriers with different frequencies for transmission. In the OFDM technology, mutually orthogonal subcarriers are used. Each subcarrier is corresponding to one symbol, and subcarrier spectra are accordingly overlapped. In this way, spectrum utilization can be greatly improved. In an OFDM system, a subcarrier spacing $\Delta f$ is a frequency difference between two neighboring subcarriers in the OFDM system. An OFDM system bandwidth is equal to a value obtained by multiplying the subcarrier spacing by a theoretically maximum subcarrier quantity in the system. The theoretically maximum subcarrier quantity in the system is a maximum subcarrier quantity when a frequency guard band is not considered, but actually, approximately 10% of guard bandwidth is usually reserved in the OFDM system. Therefore, a quantity of subcarriers that are actually configured in the system is less than the maximum subcarrier quantity.

A minimum time-domain time unit specified in an LTE physical layer is $T_S=1/(15000\times2048)$s=32.55 ns, and is corresponding to a baseband sampling rate of 30.72 MHz. A radio frame is used as an interval in both LTE physical-layer uplink and downlink transmissions. A radio frame is $T_S=307200\times T_S=10$ ms. There are two radio frame types in the LTE physical layer: type 1, applicable to FDD (frequency division duplexing, frequency division duplex); and type 2, applicable to TDD (time division duplexing, time division duplex). The two frame types differ in structures. The frame type 1 is applicable to both full duplex and half duplex FDD (frequency division duplexing, frequency division duplex). Each radio frame of 10 ms is divided into 20 timeslots. A length of each timeslot is $T_{slot}=15360\times T_S=0.5$ ms. Numbers are 0 to 19. A subframe i consists of two consecutive timeslots with numbers 2*i* and 2*i*+1. A subframe length is 1 ms, and numbers are 0 to 9. For FDD, at each 10 ms interval, each of a resource available for downlink transmission and a resource available for uplink transmission is 10 subframes because the uplink and downlink transmissions are separated in a frequency domain. The frame type 2 is applicable to TDD. A radio frame is divided into two half-frames of length $T_{slot}=153600\times T_S=5$ ms each. Each half-frame includes eight timeslots of length $T_{slot}15360\times T_S=0.5$ ms each and three special fields: DwPTS, GP, and UpPTS. A length of the DwPTS and that of the UpPTS can be configured, but a total length of the DwPTS, the UpPTS, and the GP is 1 ms. Subframes 1 and 6 include DwPTS, GP, and UpPTS. Another subframe is defined as a subframe i including a timeslot 2*i* and a timeslot 2*i*+1. A subframe 0 and a subframe 5 are used only for the downlink transmission. Flexible uplink-downlink configurations are supported, and both 5-ms and 10-ms switch-point periodicities are supported.

To overcome intersymbol interference and inter-subcarrier interference caused by wireless multipath channel time dispersion, a cyclic prefix CP is introduced. The cyclic prefix is a cyclic copy in which a guard interval between subcarriers is set to a symbol sequence, that is, a sample point within a Tg time at an end of each OFDM symbol is copied to a front of the OFDM symbol to form a prefix, where Tg is a length of the guard interval. Because a multipath delay spread is related to a cell radius and a wireless channel propagation environment, generally, a larger cell radius leads to a larger multipath delay spread. In addition, a larger CP length is needed in an LTE SFN (single-frequency network). Therefore, two CP lengths are defined in LTE: A short CP is applied to a small cell environment and is used to optimize CP overheads; and a long CP (also referred to as an extended CP) is applied to a large time dispersion case or SFN operations. A quantity $N_{symb}^{DL}$ of OFDM symbols in a timeslot depends on a CP length and a subcarrier spacing. Specifically, a time occupied by an OFDM symbol is a sum of an OFDM symbol length (an occupied time) and a CP length. The OFDM symbol length is 1/subcarrier spacing. When the subcarrier spacing is 15 KHz, there are two CP lengths that are respectively corresponding to seven OFDM symbols per timeslot and six OFDM symbols per timeslot. When the subcarrier spacing is 7.5 KHz, there is only one CP length that is corresponding to three OFDM symbols per timeslot.

$N_{RB}^{DL}N_{sc}^{RB}$ subcarriers and $N_{symb}^{DL}$ OFDM symbols that are occupied within a period of each timeslot constitute a resource grid. A structure of the resource grid (resource grid) is shown in FIG. 1. A value of $N_{RB}^{DL}$ depends on a downlink transmission bandwidth and meets $N_{RB}^{min,DL}\leq N_{RB}^{DL}\leq N_{RB}^{max,DL}$. $N_{RB}^{min,DL}$ and $N_{RB}^{max,DL}$ are supported minimum and maximum downlink transmission bandwidths. An element in a resource grid for an antenna port p is referred to as a resource element (resource element), and is uniquely determined by frequency domain and time domain coordinates (k,l), where $k=0, \ldots, N_{RB}^{DL}N_{sc}^{RB}-1$, and $l=0, \ldots, N_{symb}^{DL}-1$. A physical meaning is a modulation symbol on a subcarrier in a timeslot in an LTE system. A resource block (resource block, RB) is used to describe a mapping of a specific physical channel to a resource element. A physical resource block is defined as a resource that occupies $N_{symb}^{DL}$ consecutive OFDM symbols in a time domain and that occupies $N_{sc}^{RB}$ consecutive subcarriers in a frequency domain. For example, $N_{symb}^{DL}$ and $N_{sc}^{RB}$ may be given in the following table.

| Configuration (configuration) | | $N_{sc}^{RB}$ | $N_{symb}^{DL}$ |
|---|---|---|---|
| Normal CP (normal cyclic prefix) | Δf = 15 KHz | 12 | 7 |
| Extended CP | Δf = 15 KHz | | 6 |
| (extended cyclic prefix) | Δf = 7.5 KHz | 24 | 3 |

A physical resource block (physical resource block, PRB) includes $N_{symb}^{DL}\times N_{RB}^{DL}-1$ resource elements, lasts for a period of one timeslot in the time domain, and occupies 180 KHz in the frequency domain. Physical resource blocks are numbered from 0 to $N_{RB}^{DL}-1$ in the frequency domain. A correspondence between the number $n_{PRB}$ of the physical resource block in the frequency domain and the resource element (k,l) is $$n_{PRB}=\left\lfloor\frac{k}{N_{sc}^{RB}}\right\rfloor,$$

where k is a frequency-domain index, and l is a time-domain index.

In an existing wireless communications network, for example, an LTE network, if UE needs to access an LTE cell, the UE needs to perform a cell search (cell search) process, that is, a process in which the UE detects a cell identity (ID) and implements time-frequency synchronization with the cell.

Cell search is a process in which UE implements downlink time-frequency synchronization with an E-UTRAN and obtains a serving cell ID. A basic cell search process is divided into two steps:

Step 1: The UE demodulates a primary synchronization signal to implement symbol synchronization, and obtains an intra-cell-group ID to implement rough frequency offset estimation.

Step 2: The UE demodulates a secondary synchronization signal to implement frame synchronization, and obtains a CP length and a cell group ID to implement precise frequency offset estimation.

In an existing LTE protocol, a serving cell ID is referred to as a physical-layer cell ID (represented as $N_{ID}^{cell}$), an intra-cell-group ID is referred to as a physical-layer ID (represented as $N_{ID}^{(2)}$) that is a physical-layer ID within a physical-layer cell-ID group, and a cell group ID is referred to as a physical-layer cell-ID group (represented as $N_{ID}^{(1)}$). In the existing LTE protocol, $N_{ID}^{cell}=3N_{ID}^{(1)}+N_{ID}^{(2)}$. A value of $N_{ID}^{(2)}$ is 0, 1, or 2. A value of $N_{ID}^{(1)}$ is an integer between 0 to 167 (including 0 and 167).

Initial Cell Search (Initial Cell Search):

After the UE is powered on, the UE starts to perform initial cell search. The UE does not know a bandwidth and a frequency channel number of a network at the first startup.

The UE repeats the basic cell search process, and traverses all frequency channel numbers of an entire spectrum to try to demodulate a synchronization signal. The process takes a relatively long time, but generally, a requirement for the time is not strict. A subsequent initial cell search time of the UE may be reduced by using some methods. For example, the UE stores previous available network information, and first searches these networks after startup.

Once the UE finds an available network, implements time-frequency synchronization with the network, and obtains a serving cell ID, that is, after completing the cell search, the UE demodulates a downlink physical broadcast channel (PBCH) to obtain system information such as a system bandwidth and a transmit antenna quantity.

It can be learned that the cell search process of the UE is irrelevant to a transmitted service.

After completing the process, if the UE initiates no calling, the UE demodulates a physical downlink control channel (PDCCH) to obtain a paging cycle assigned by the network to the UE, and then wakes from an idle state in the fixed paging cycle to demodulate the PDCCH, to listen to paging. If there is paging that belongs to the UE, the UE demodulates a specified physical downlink shared channel (PDSCH) resource to receive the paging.

If the UE initiates calling, the UE initiates a random access (for example, by using a physical random access channel PRACH), requests to allocate an uplink resource, obtains the uplink resource by reading a control channel such as a PDCCH, and then performs uplink transmission (for example, by using a physical uplink shared channel PUSCH).

In current LTE cell search, all downlink transmission bandwidths (also referred to as system bandwidths) 1.4 MHz, 3 MHz, 5 MHz, 10 MHz, 15 MHz, and 20 MHz can be supported. It may be understood that the system bandwidth herein may also be referred to as a bandwidth occupied by a carrier. In a specific implementation, a guard interval may be set between different carriers. Therefore, in an actual implementation, a downlink transmission bandwidth is less than a system bandwidth, and an impact of the guard interval is not considered herein. A carrier consists of a consecutive frequency domain resource on a spectrum. The resource on the carrier is further divided, and each consecutive frequency domain resource obtained by means of division is referred to as a subband of the carrier in this embodiment of the present disclosure. It can be learned from above that, information that may be obtained by means of cell synchronization includes timing information of a symbol and that of a radio frame, frequency information, a cell ID, a CP length, a system bandwidth, an antenna configuration (read from a PBCH), and the like. In the LTE network, two types of physical signals, respectively a primary synchronization signal (PSS, also referred to as a primary synchronization channel PSCH) and a secondary synchronization signal (SSS, also referred to as a secondary synchronization channel SSCH), are used in a synchronization process. The primary synchronization signal is used to obtain a 5 ms clock and an intra-cell-group ID. The secondary synchronization signal is used to obtain a radio-frame clock and a cell group ID. An existing LTE synchronization channel is located in subframes 0 and 5 in each radio frame, and occupies six PRBs in a middle of a bandwidth in a frequency domain. A frame type 1 is used as an example. In a time domain, the primary synchronization signal is mapped to the last symbol in the first timeslot (a timeslot 0) and that in the eleventh timeslot (a timeslot 10) in each radio frame, that is, $l=N_{symb}^{DL}-1$. In the frequency domain, the primary synchronization signal is mapped to 62 subcarriers centered on a DC (direct current, direct current) subcarrier (no data symbol is sent on the subcarrier). In the time domain, the secondary synchronization signal is mapped to the last but one symbol in the timeslot 0 and that in the timeslot 10 in each radio frame. In the frequency domain, the secondary synchronization signal is also mapped to the 62 subcarriers centered on the DC subcarrier. In a frame type 2, the primary synchronization signal is located in the third symbol in the third timeslot and that in the thirteenth timeslot, and the secondary synchronization signal is three symbols earlier than the primary synchronization signal, that is, the secondary synchronization signal is located in the last symbol in the second timeslot and that in the twelfth timeslot. In this embodiment of the present disclosure, the primary synchronization channel and the secondary synchronization channel are collectively referred to as synchronization channels.

Figure 2:
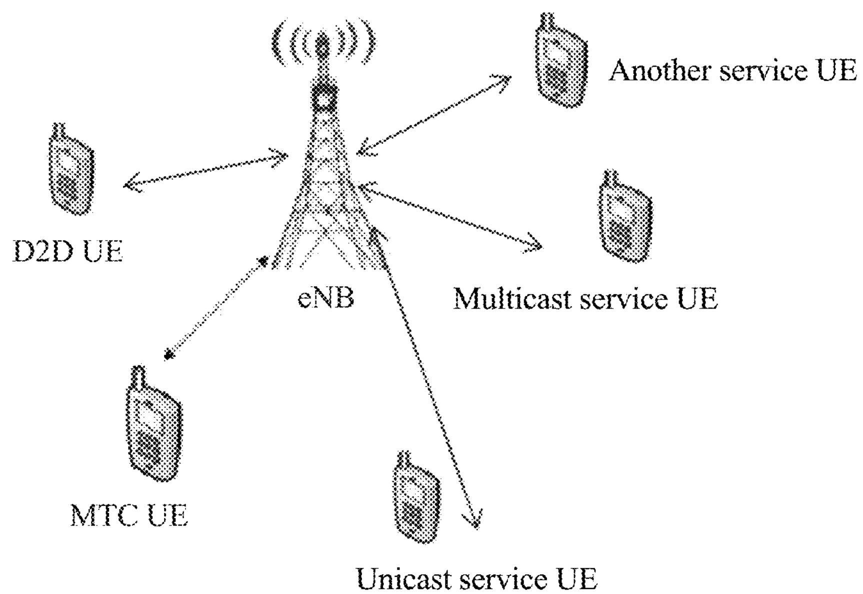
FIG. 2 is a schematic diagram in which an eNB sends different service data to multiple UEs according to an aspect of the present disclosure.
Figure 3:
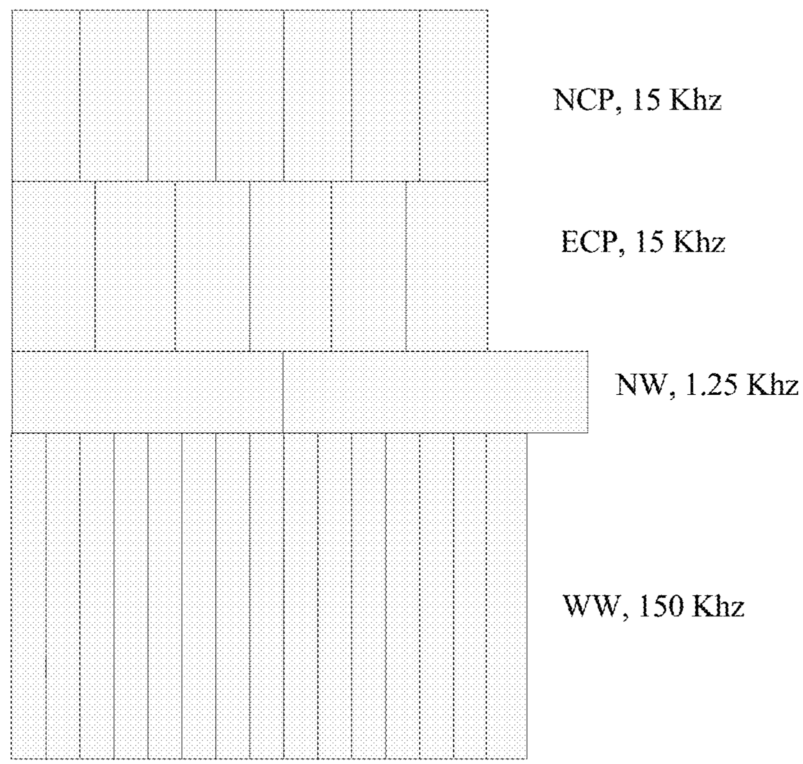
FIG. 3 is a schematic diagram of frame structures corresponding to common services of four types according to an aspect of the present disclosure.

With development of an LTE technology, due to an increase in service types, services of different types are required to be sent on a same carrier at a same moment, so as to effectively use scattered carriers and improve spectral efficiency. The scattered carriers are idle parts that are of relatively small bandwidths and that are scattered on the carrier. In addition, in a newly-defined service orientation radio access network (service orientation RAN (radio access network), SOR) scenario, an eNB may simultaneously send services of multiple types to multiple UEs, or may send services of multiple types to one UE. Currently existing service types include an MTC service, a D2D service, a unicast service, a multicast service, and the like. FIG. 2 is a schematic diagram in which an eNB sends different service data to multiple UEs. For services of various types, because the services use different subcarrier spacings and different CPs, respective frame structures corresponding to the services are different. In all embodiments of the present disclosure, a frame structure of a service includes a subcarrier spacing, a CP length, a frequency domain resource, and a time domain resource that are used when service data is transmitted, where the frequency domain resource and the time domain resource are occupied by the service. A structure of a channel includes a subcarrier spacing, a CP length, a time domain resource, and a frequency domain resource that are used when the channel is transmitted. The time domain resource may include an absolute time or a relative time. The relative time may include a relative location of an occupied symbol in a subframe, a relative location of an occupied subframe in a radio frame, a frame number of an occupied radio frame, or the like. The frequency domain resource may include an absolute frequency or a relative frequency. The relative frequency may include a location of a frequency of an occupied RB on a carrier. FIG. 3 shows frame structures corresponding to common services of several types. The frame structures are from top to bottom successively: a frame structure 1 corresponding to a unicast service with a subcarrier spacing of 15 KHz and a normal CP (normal CP (NCP (normal CP)), 15 KHz), a frame structure 2 corresponding to a multicast service with a subcarrier spacing of 15 KHz and an extended CP (extended CP (ECP (extended CP)), 15 KHz), a frame structure 3 corresponding to a narrowband MTC service with a subcarrier spacing of 1.25 KHz (NW (narrow bandwidth), 1.25 KHz), and a frame structure 4 corresponding to a high-frequency wideband service with a subcarrier spacing of 150 KHz (WW (wide bandwidth), 150 KHz). It can be learned that the frame structures corresponding to the services of various types may not be aligned in the time domain because the services of various types are corresponding to different subcarrier spacings and different CP lengths. For example, the frame structure 1 is not aligned with the frame structure 3. In an existing LTE network solution, a synchronization channel is sent only on six PRBs in a middle of a carrier frequency band, and a time-frequency location of the synchronization channel is corresponding to a frame structure with a subcarrier spacing of 15 KHz and a normal CP. In this way, access synchronization cannot be consequently implemented on services of some types by using the existing solution. In all the embodiments of the present disclosure, a synchronization channel whose time-frequency location is corresponding to the frame structure with a subcarrier spacing of 15 KHz and a normal CP is referred to as a legacy synchronization channel.

An embodiment of the present disclosure provides a common information sending method that may be used in a scenario in which there are services of multiple types. Common information may include at least one of a synchronization signal, a broadcast signal, or a system message. In this embodiment of the present disclosure, a description is provided by using an example in which wireless network devices are an eNB and UE. In this embodiment of the present disclosure, services of multiple types are transmitted on a same carrier, and a channel for common information corresponding to any one of the services of multiple types is also transmitted on the same carrier. The channel for common information is a channel that is used to bear the common information.

Optionally, the services of multiple types may be transmitted in a same subframe of the same carrier.

Optionally, two channels for common information corresponding to at least two services in the services of multiple types may also be transmitted in the same subframe of the same carrier. The carrier for transmitting the channel for common information is the same as the carrier for transmitting the services.

Optionally, the services of multiple types may be services transmitted with multiple UEs, or may be services transmitted with one UE.

Optionally, a structure of the channel for common information may be corresponding to a service feature. The service feature may include at least one of a type of a service or a frame structure of a service. In this way, a service having a specific feature can be accessed according to a channel for common information corresponding to the service, and a prior-art problem that some services cannot be accessed by using an existing channel for common information is accordingly resolved. Because at least two services may be transmitted on the same carrier, the same carrier may include at least two channels for common information that are corresponding to the at least two services.

A relationship between the type of the service (which may be abbreviated to the service type) and the frame structure of the service (which may be abbreviated to the service frame structure) may be that services of multiple types are corresponding to one frame structure, or that services of different types are corresponding to different frame structures (that is, in a one-to-one correspondence), or that a service of one type is corresponding to multiple frame structures. This is not limited herein.

(1) The structure of the channel for common information is corresponding to the frame structure of the service:

Optionally, in this embodiment of the present disclosure, the structure of the channel for common information may be corresponding to the frame structure of the service, so that a service having a specific frame structure (for example, a service having a frame structure A) can be accessed according to a channel for common information (for example, a channel A) corresponding to the service. Therefore, a prior-art problem that services of some types cannot be accessed by using an existing channel for common information is resolved.

Optionally, that the structure of the channel for common information may be corresponding to the frame structure of the service includes: a service having a specific frame structure (for example, a service having a frame structure A) has a same subcarrier spacing and a same CP length as those of a channel for common information (for example, a channel A) corresponding to the service. In this way, the service having a specific frame structure can be aligned, in a time domain, with the channel for common information corresponding to the service, to facilitate access to the service.

Optionally, that the structure of the channel for common information may be corresponding to the frame structure of the service includes: a service having a specific frame structure (for example, a service having a frame structure A) is corresponding to a frequency domain resource used for a channel for common information (for example, a channel A) corresponding to the service. Optionally, a subband occupied by the channel for common information corresponding to the service is the same as a subband occupied by the service having a specific frame structure. In this way, when performing access, the UE may perform blind detection only for a frequency band corresponding to a service that needs to be accessed. Therefore, UE implementation complexity can be reduced and power can be saved.

Optionally, that the structure of the channel for common information may be corresponding to the frame structure of the service includes: a service having a specific frame structure (for example, a service having a frame structure A) and a channel for common information (for example, a channel A) corresponding to the service have same subcarrier spacings and different CP lengths. In this case, a synchronization channel in the channel for common information occupies at least the last symbol in a subframe, and a time-domain boundary of the subframe in which the symbol is located is aligned with that of a subframe in the frame structure of the service. In this way, the service having a specific frame structure can be aligned, in a time domain, with the channel for common information corresponding to the service, to facilitate access to the service. In addition, the channel for common information can be shared with services having different frame structures, and resources occupied by the channel for common information can be accordingly reduced.

Optionally, that the structure of the channel for common information may be corresponding to the frame structure of the service includes: services of a same type are corresponding to a same channel for common information. In this way, because types of the services are the same, and frame structures of the services are usually the same, a channel for common information may be allocated according to the types of the services, so that when receiving services of different types, the UE can concern only a channel for common information corresponding to a type of service that is received by the UE. Optionally, when two services of a same type are located on different subbands of the same carrier, common information transmitted on the subband of one of the services may carry subband information of the other service. It may be understood that if an offset between the subbands of the two services is fixed, the subband information may not be carried.

Optionally, that the structure of the channel for common information may be corresponding to the frame structure of the service includes: services having same subcarrier spacings and same CP lengths are corresponding to a same channel for common information, or services having same subcarrier spacings and different CP lengths are corresponding to a same channel for common information. In this way, a channel for common information may be allocated according to the frame structure of the service, rather than according to a type of the service. Because services of different types may have same frame structures, resources occupied by the channel for common information can be reduced. Optionally, when the two services corresponding to the same channel for common information are located on the different subbands of the same carrier, the common information transmitted on the subband of one of the services may carry the subband information of the other service. It may be understood that if the offset between the subbands of the two services is fixed, the subband information may not be carried.

Optionally, that the structure of the channel for common information may be corresponding to the frame structure of the service includes: a service having a specific frame structure (for example, a service having a frame structure A) is corresponding to a codeword resource used for a channel for common information (for example, a channel A) corresponding to the service. That is, for services having different frame structures, codeword resources used for channels for common information corresponding to the services having different frame structures are different. In this way, when receiving the service having a specific frame structure, the UE conveniently identifies the channel for common information corresponding to the service.

Optionally, that the structure of the channel for common information may be corresponding to the frame structure of the service includes: if a service having a specific frame structure (for example, a service having a frame structure A) is corresponding to a frequency domain resource used for a channel for common information (for example, a channel A) corresponding to the service, codeword resources used for services having different frame structures and channels for common information corresponding to the services may be the same or may be different. In this way, when receiving the service having a specific frame structure, the UE may identify, by using the frequency domain resource, the channel for common information corresponding to the service. When the codeword resources used for the services having different frame structures and the channels for common information corresponding to the services may be the same, use of codeword resources can be reduced, and transmit-side and receive-side implementation complexity can be reduced.

Optionally, that the structure of the channel for common information may be corresponding to the frame structure of the service includes: if a service having a specific frame structure (for example, a service having a frame structure A) is corresponding to a frequency domain resource used for a channel for common information (for example, a channel A) corresponding to the service, time domain resources used for services having different frame structures and channels for common information corresponding to the services may be the same or may be different. In this way, when receiving the service having a specific frame structure, the UE may identify, by using the frequency domain resource, the channel for common information corresponding to the service. When the time domain resources used for the services having different frame structures and the channels for common information corresponding to the services are the same, transmit-side and receive-side implementation complexity can be reduced.

Optionally, in this embodiment of the present disclosure, a channel for common information (for example, a channel B) corresponding to a service having a specific frame structure (for example, a service having a frame structure B) may bear information used for accessing a service having another frame structure (for example, a service having a frame structure C) (the channel B bearing the information for access is referred to as a channel C). For example, the specific channel for common information bears frequency information required for accessing a service having another frame structure, such as an offset (offset) between a frequency of a specific channel for common information and a frequency of an existing channel for common information; and/or the specific channel for common information bears time information required for accessing a service having another frame structure, such as an offset between a time of a specific channel for common information and a time of an existing channel for common information, so as to reduce use of resources when services having different frame structures are accessed.

Optionally, sending the channel for common information (for example, the channel A or the channel C) corresponding to the service having a specific frame structure may be performed after being triggered by UE. A UE trigger is sent after the UE implements synchronization with the eNB by using another channel for common information. In this way, before the UE transmits a service, the UE may first implement synchronization with the eNB by using a channel for common information (for example, the channel B), for example, perform synchronization by using an existing channel for common information, and then when needing to transmit the service, trigger the eNB to deliver a channel for common information corresponding to the service, so as to transmit the service.

(2) The structure of the channel for common information is corresponding to the type of the service:

The structure of the channel for common information may be corresponding to the type of the service. For example, service types are the same, and frame structures of services are the same (for example, subcarrier spacings are the same and CP lengths are the same, or subcarrier spacings are the same and CP lengths are different). Service types are different, and frame structures of services may be the same or may be different. That is, when a quantity of service types is greater than a quantity of corresponding frame structures of services, the channel for common information is configured in a manner in which the structure of the channel for common information is corresponding to the type of the service.

A difference between the method (2) and the foregoing method (1) lies in that, the structure of the channel for common information may be corresponding to the type of the service, so that a service of a specific type (for example, a service A) can be accessed according to a channel for common information (for example, a channel A) corresponding to the service. Therefore, a prior-art problem that services of some types cannot be accessed by using an existing channel for common information is resolved. The service having a specific frame structure mentioned in the foregoing method correspondingly changes to the service of a specific type. For other descriptions of a frame structure of the service of the type, refer to descriptions in the foregoing method. Details are not described herein again.

(3) Both the type of the service and the frame structure of the service are considered for the structure of the channel for common information:

During configuration, because a correspondence between the type of the service and the frame structure of the service may be a one-to-many correspondence, a one-to-one correspondence, or a many-to-one correspondence, a manner of considering both the type of the service and the frame structure of the service is used when the channel for common information is configured.

For example, for two services whose service types are the same, subcarrier spacings of the two services are the same but CP lengths of the two services are different (that is, frame structures are different). In this case, after the service type is considered, the frame structure may be further considered to configure a channel for common information. Because a system is designed to configure two different channels for common information for two services whose subcarrier spacings are the same but CP lengths are different, the system configures, for the two services whose types are the same, two channels for common information that are respectively used for sending common information corresponding to the two services.

For example, for two services whose service types are different, subcarrier spacings of the two services are the same and CP lengths of the two services are also the same, but subbands on which the two services are located are different. In this case, after the service type is considered, the frame structure may be further considered to configure a channel for common information. For example, according to a preset rule or requirement, it may be configured that two channels for common information are located on the respective subbands of the two services, or it may be configured that one channel for common information is located on the subband of one of the services, and that the other service shares the channel for common information, where the channel for common information carries frequency domain resource information of the other service.

Similarly, the frame structure may be first considered rather than the service type. A principle and a method in this manner are similar to those in the manner in which the frame structure or the service type is separately considered or those in the manner in which the service type is first considered rather than the frame structure. Details are not described herein again.

Because the configuration or transmission of the channel for common information provided in this embodiment of the present disclosure is related to (corresponding to) a transmitted service, required common information may be received before transmission of multiple different services. Further, the UE may receive a corresponding channel for common information according to a service that needs to be transmitted by the UE. For example, in a case of frequency synchronization and time out-of-synchronization, the UE may perform cell search only on a specific subband related to the service that needs to be transmitted by the UE. Therefore, UE implementation complexity can be reduced, and resource consumption of the UE can be reduced.

Figure 4:
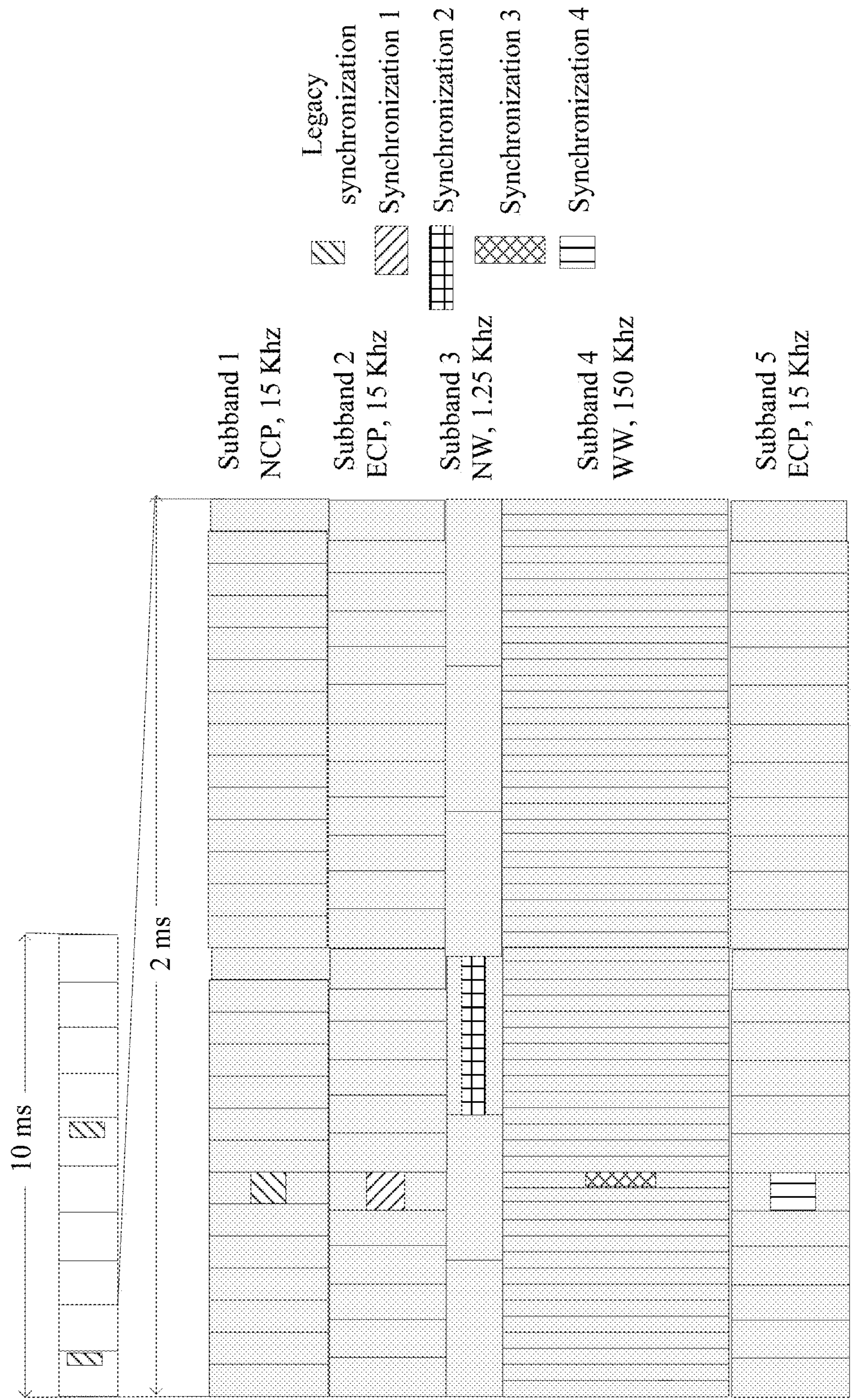
FIG. 4 is a schematic diagram of a case in which multiple services are transmitted on a same carrier in FDD and of frame structures of synchronization channels corresponding to the multiple services according to an aspect of the present disclosure.

Based on the foregoing method, the present disclosure provides a structure of a channel for common information that may be used in a scenario in which there are services of multiple types. Common information may include but is not limited to at least one of a synchronization signal, a broadcast signal, or a system message. As shown in FIG. 4, in an FDD system, the structure of the channel includes:

At least two channels for common information are included in a same carrier, where the at least two channels for common information include a first channel for common information and a second channel for common information, and the first channel for common information and the second channel for common information are on different subbands.

Optionally, first common information and second common information may have same functions, for example, be both primary synchronization signals or be both secondary synchronization signals.

Optionally, the two channels for common information occupy different time domain resources and/or codeword resources.

Optionally, the two channels for common information each occupy middle resource blocks (RB) of the respective subbands.

Optionally, a structure of the first channel for common information and a structure of the second channel for common information are different.

In all embodiments of the present disclosure, because a primary synchronization signal and a secondary synchronization signal are used together for implementing synchronization, the primary synchronization signal and the secondary synchronization signal constitute a channel for common information (that is, a synchronization channel). It may be understood that, in some networks such as a future network, a synchronization channel may include only one synchronization signal (without distinguishing between a primary synchronization signal and a secondary synchronization signal). This is not limited in the embodiments of the present disclosure.

At least two services may be further included in the same carrier.

The terms “first” and “second” are used to distinguish between channels and descriptions corresponding to the channels.

Any structure of a channel includes a subcarrier spacing, a CP length, a time domain resource, and a frequency domain resource that are used for transmitting the channel. The frequency domain resource includes an occupied subband. Optionally, the structure of the first channel for common information includes at least a first subcarrier spacing, a first CP length, and a first subband that are used for transmitting the channel. The structure of the second channel for common information includes a second subcarrier spacing, a second CP length, and a second subband that are used for transmitting the channel.

The common information includes at least one of a synchronization signal, a broadcast signal, or a system message.

Optionally, that a structure of the first channel for common information and a structure of the second channel for common information are different may include: the first subcarrier spacing and the second subcarrier spacing are different, and the first cyclic prefix length and the second cyclic prefix length are different.

Optionally, that a structure of the first channel for common information and a structure of the second channel for common information are different may include: the first subcarrier spacing and the second subcarrier spacing are the same, and the first cyclic prefix length and the second cyclic prefix length are different.

Optionally, the foregoing structure further includes:

the structure of the first channel for common information is corresponding to a first service feature, and the structure of the second channel for common information is corresponding to a second service feature. The first or second service feature may include at least one of a service type or a service frame structure. It may be understood that, when the first service feature is the service type, a description of the second service feature is also for the service type, and when the first service feature is the service frame structure, a description of the second service feature is also for the service frame structure.

For a specific case in which the structure of the channel for common information is corresponding to the service feature, refer to the description in the foregoing method. Details are not described herein again.

Figure 5:
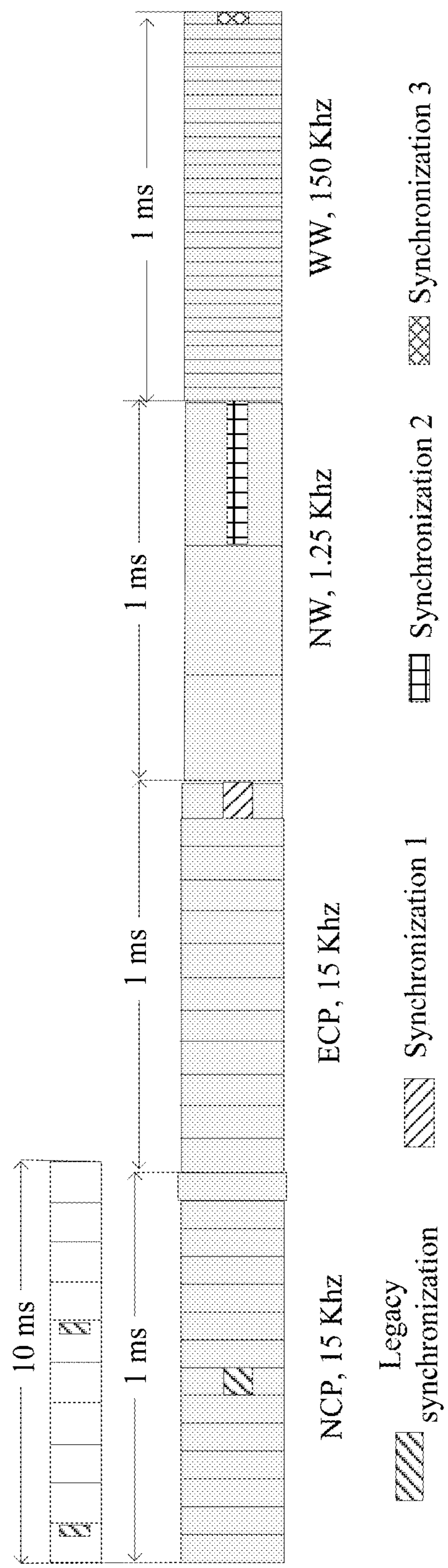
FIG. 5 is a schematic diagram of a case in which multiple services are transmitted on a same carrier in TDD and of frame structures of synchronization channels corresponding to the multiple services according to an aspect of the present disclosure.

As shown in FIG. 5, in a TDD system, the structure of the channel includes:

At least two channels for common information are included in a same carrier, where the at least two channels for common information include a first channel for common information and a second channel for common information, the first channel for common information and the second channel for common information are in different time periods of a same subband, and the first channel for common information and the second channel for common information have same subcarrier spacings and different CP lengths, or the first channel for common information and the second channel for common information have different subcarrier spacings and different CP lengths.

Optionally, first common information and second common information may have same functions, for example, be both primary synchronization signals or be both secondary synchronization signals.

Optionally, the two channels for common information occupy different time domain resources and/or codeword resources. The time domain resource herein may be a relative location of an occupied symbol in a subframe in which the symbol is located.

Optionally, the two channels for common information each occupy middle resource blocks (RB) of the subbands on which the channels are located.

Optionally, a structure of the first channel for common information and a structure of the second channel for common information are different.

At least two services may be further included in the same carrier.

The terms "first" and "second" are used to distinguish between channels and descriptions corresponding to the channels.

Any structure of a channel includes a subcarrier spacing, a CP length, a time domain resource, and a frequency domain resource that are used for transmitting the channel. The frequency domain resource includes an occupied subband. The time domain resource includes an occupied time period. Optionally, the structure of the first channel for common information includes at least a first subcarrier spacing, a first CP length, and a first time period that are used for transmitting the channel. The structure of the second channel for common information includes a second subcarrier spacing, a second CP length, and a second time period that are used for transmitting the channel.

The common information includes at least one of a synchronization signal, a broadcast signal, or a system message.

Optionally, that a structure of the first channel for common information and a structure of the second channel for common information are different may include: the first subcarrier spacing and the second subcarrier spacing are different, and the first cyclic prefix length and the second cyclic prefix length are different.

Optionally, that a structure of the first channel for common information and a structure of the second channel for common information are different may include: the first subcarrier spacing and the second subcarrier spacing are the same, and the first cyclic prefix length and the second cyclic prefix length are different.

Optionally, the foregoing structure further includes:

the structure of the first channel for common information is corresponding to a first service feature, and the structure of the second channel for common information is corresponding to a second service feature. The first or second service feature may include at least one of a service type or a service frame structure. It may be understood that, when the first service feature is the service type, a description of the second service feature is also for the service type, and when the first service feature is the service frame structure, a description of the second service feature is also for the service frame structure.

For a specific case in which the structure of the channel for common information is corresponding to the service feature, refer to the description in the foregoing method. Details are not described herein again.

For example, the following specifically describes a channel structure or a sending method by using an example in which a channel for common information is a synchronization channel.

Resource Multiplexing Manner

Two synchronization channels occupy different resources. The resource may include at least one or more of a time domain resource, a frequency domain resource, or a codeword resource. That the different resources are occupied includes: occupied resources of at least one type of a time domain resource, a frequency domain resource, or a codeword resource are different.

In an implementation, at least two synchronization channels may be sent on different subbands of a same carrier, that is, frequency division multiplexing. For example, as shown in FIG. 4, a first synchronization channel is sent on a first subband (a subband 1) of a carrier, and a second synchronization channel is sent on a second subband (a subband 2) of the same carrier. Further, a first service is also sent on the first subband (the subband 1). For example, the first synchronization channel occupies a middle location of the first subband. Likewise, a second service is sent on the second subband (the subband 2). For example, the second synchronization channel occupies a middle location (that is, a middle resource block) of the second subband. In this manner, the first synchronization channel and the second synchronization channel may be located at a same symbol location or different symbol locations in a same subframe, be located at same symbol locations in different subframes, or be located at different symbol locations in different subframes.

In another implementation method, at least two synchronization channels may be sent in different time periods on a same subband (a subband 3) of a same carrier, that is, time division multiplexing. For example, as shown in FIG. 5, a first service and a second service are also sent in the different time periods on the subband 3, that is, time division multiplexing. Correspondingly, a first synchronization channel is sent in the time period in which the first service is located, a second synchronization channel is sent in the time period in which the second service is located, and a specific location of the first synchronization channel and that of the second synchronization channel may be determined according to the implementation. In a frequency domain, the first synchronization channel may be located at a middle location of the subband 3 in frequency, and the second synchronization channel may also be located at the middle location of the subband 3 in frequency.

Regardless of the foregoing frequency division multiplexing implementation or time division multiplexing implementation, the first synchronization channel and the second synchronization channel may use a same sequence, or may use different sequences.

In a frequency division multiplexing case, a time domain resource for the first synchronization channel and that for the second synchronization channel may be the same, or may be different.

For example, for an FDD frame type, a unicast service with 15 KHz and an extended CP and a broadcast multicast service with 7.5 KHz and an extended CP are used as examples. Time-frequency locations, resource mappings, and corresponding sequences of synchronization channels of the two services may be shown in FIG. 6 to FIG. 9.

Figure 6:
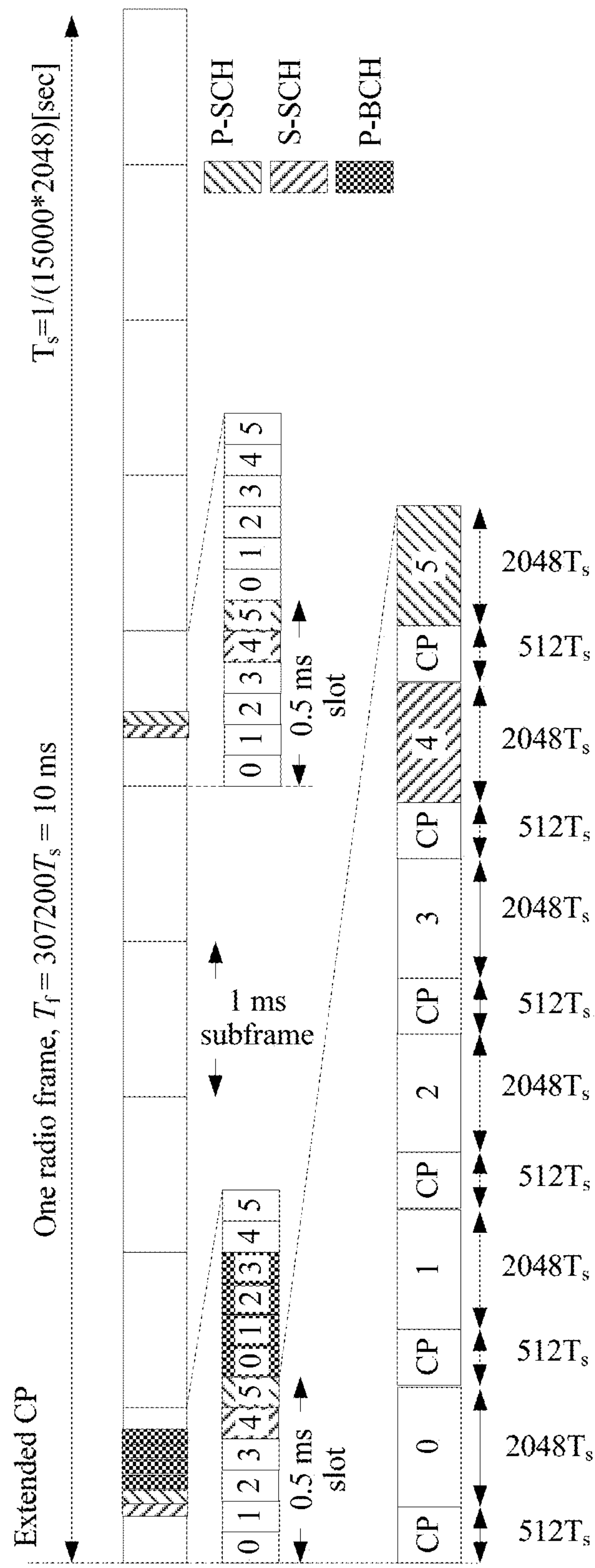
FIG. 6 is a schematic diagram of a time domain location of a synchronization signal of a unicast service according to an aspect of the present disclosure.
Figure 7:
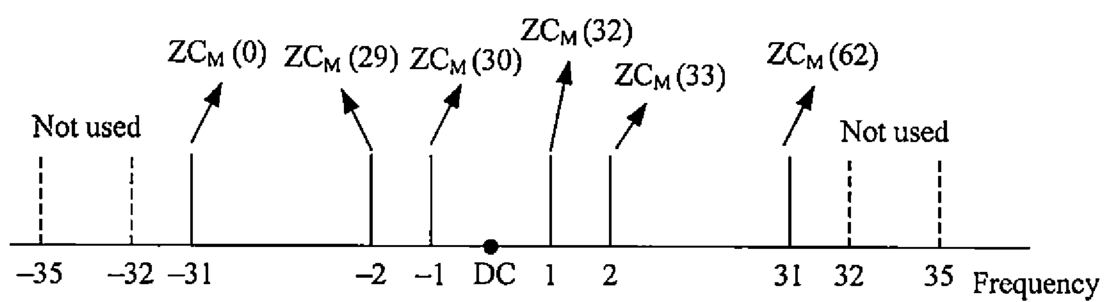
FIG. 7 is a schematic diagram of a frequency domain location of a synchronization signal of a unicast service according to an aspect of the present disclosure.

FIG. 6 is a schematic diagram of a time domain location of a synchronization signal of a unicast service. FIG. 7 is a schematic diagram of a frequency domain location of the synchronization signal of the unicast service. In FIG. 6, illustration is provided by using an example in which a subframe length is 1 ms, a subframe includes two timeslots, and each timeslot is 0.5 ms. As shown in FIG. 6 and FIG. 7, the unicast synchronization signal is located in the last two symbols in the first timeslot (timeslot) in a time domain, and is located on six resource blocks (RB) (1.08 M) in a middle in a frequency domain (a frequency domain resource used for a primary synchronization signal and that used for a secondary synchronization signal are the same). A ZC sequence is used for the primary synchronization signal (P-SCH) (for specific sequence generation, refer to the prior art). Root indices are 25, 29, and 34. A resource mapping is as follows: The primary synchronization signal is mapped to 62 subcarriers centered on a DC and to the last symbol in the first timeslot. An M sequence is used for the secondary synchronization signal (S-SCH) (for specific sequence generation, refer to the prior art). A resource mapping is as follows: The secondary synchronization signal is mapped to the 62 subcarriers centered on the DC subcarrier and to the last but one symbol in the first timeslot.

Figure 8:
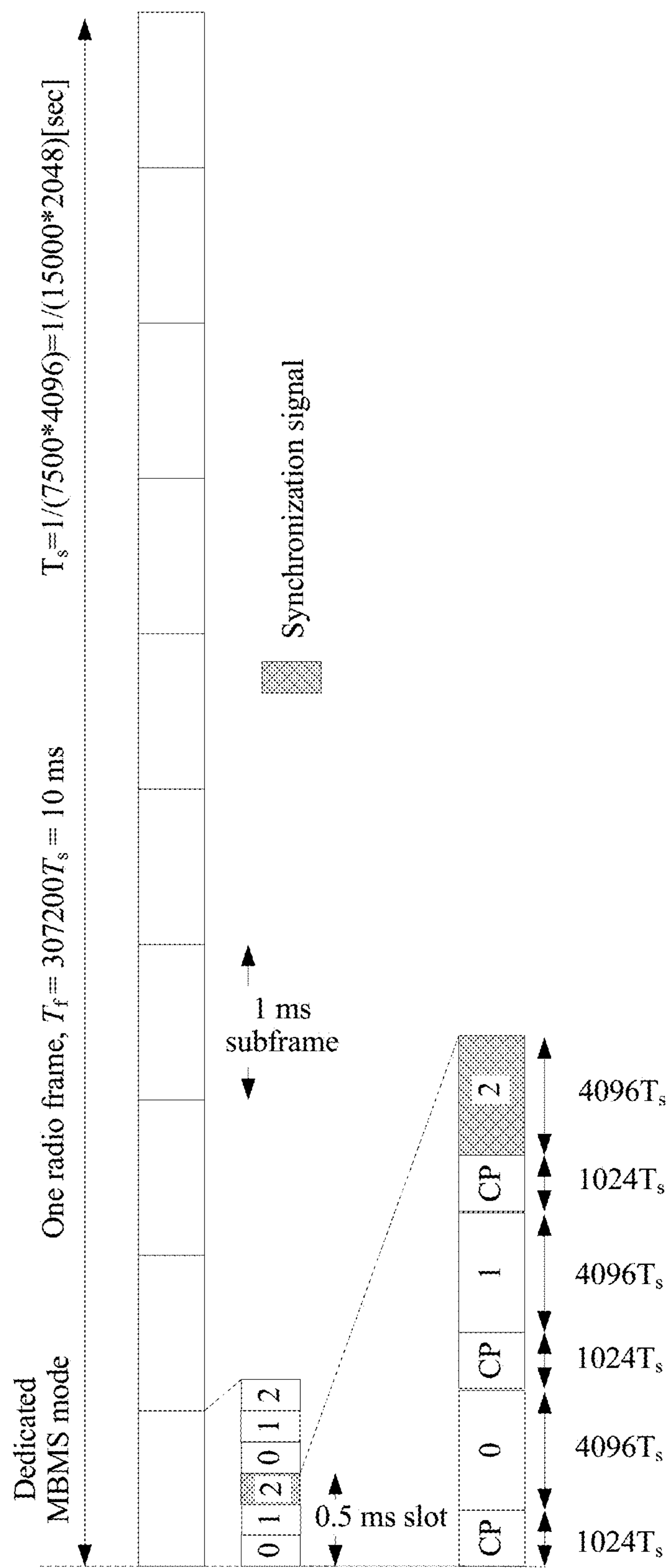
FIG. 8 is a schematic diagram of a time domain location of a synchronization signal of a 7.5 KHz dedicated broadcast multicast service according to an aspect of the present disclosure.
Figure 9:
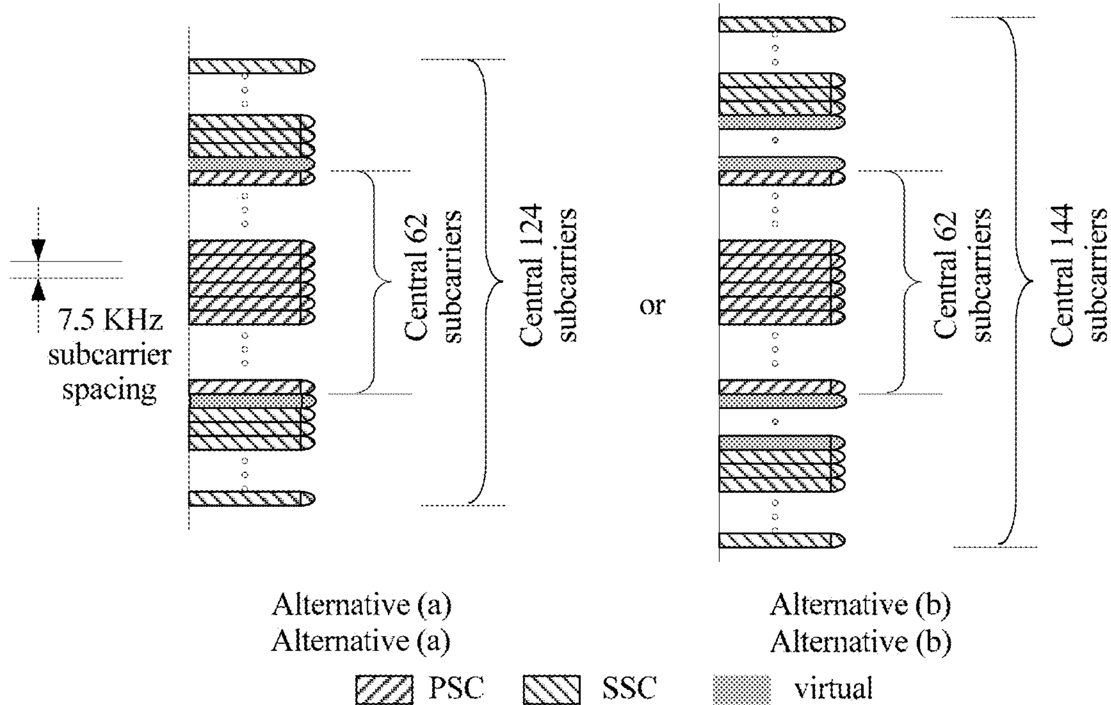
FIG. 9 is a schematic diagram of a frequency domain location of a synchronization signal of a 7.5 KHz dedicated broadcast multicast service according to an aspect of the present disclosure.

FIG. 8 is a schematic diagram of a time domain location of a synchronization signal of a 7.5 KHz dedicated broadcast multicast service. FIG. 9 is a schematic diagram of a frequency domain location of the synchronization signal of the 7.5 KHz dedicated broadcast multicast service. In FIG. 8, illustration is provided by using an example in which a subframe length is 1 ms, a subframe includes two timeslots, and each timeslot is 0.5 ms. As shown in FIG. 8 and FIG. 9, a timeslot includes three symbols, and the synchronization signal includes a primary synchronization signal and a secondary synchronization signal, is located in the last symbol in the first timeslot in a time domain, and is located on 12 RBs (1.08 M) in a middle in a frequency domain. A ZC sequence is used for the primary synchronization signal. Root indices may be root indices (for example, 23, 27, and 37) different from those for the unicast service. Different primary synchronization signals are generated according to the different root indices. The primary synchronization signal is mapped to 62 subcarriers centered on a DC (for example, a PSC shown in FIG. 9). As shown in FIG. 9, an M sequence is used for the secondary synchronization signal, and may be the same as (a generation manner is unchanged) or different from a sequence generated in the unicast service. The secondary synchronization signal is mapped to 62 subcarriers on two sides of the primary synchronization signal (for example, an SSC shown in FIG. 9).

Synchronization Channel Allocation

Optionally, in an implementation, at least two services are transmitted on a same carrier. The at least two services include a first service and a second service. That a first frame structure corresponding to the first service and a second frame structure corresponding to the second service are different may be specifically: a subcarrier spacing and a CP length of the first frame structure are different from those of the second frame structure. On the same carrier, a first synchronization channel is allocated to the first service, and a second synchronization channel is allocated to the second service. A subcarrier spacing and a CP length of the first synchronization channel are the same as those of the first service. A subcarrier spacing and a CP length of the second synchronization channel are the same as those of the second service.

In this implementation, when the at least two services further include a third service, the third service is corresponding to a third frame structure, and the third frame structure and the second frame structure have same subcarrier spacings and different CP lengths, but time-domain boundaries of the last symbols included in subframes are aligned, the second synchronization channel corresponding to the second frame structure may be further corresponding to the third frame structure, that is, corresponding to the third service. That is, the second service and the third service share one synchronization channel. When the at least two services further include a fourth service, the fourth service is corresponding to a fourth frame structure, and the fourth frame structure and the second frame structure have same subcarrier spacings and same CP lengths, the second synchronization channel corresponding to the second frame structure may be further corresponding to the fourth frame structure, that is, corresponding to the fourth service. That is, the second service and the fourth service share one synchronization channel. It may be understood that, a description is provided only by using an example in which the second service and another service share one synchronization channel, and when the foregoing relationship exists between the frame structure corresponding to the first service and that corresponding to the another service, the first service may also share the first synchronization channel with the another service. Either the first service or the second service is in a general sense. The terms "first" and "second" are used to distinguish between descriptions of the two services, and there is no other limitation.

Optionally, in another implementation, a synchronization channel sharing rule is stricter. When the at least two services further include a third service, and the third service is corresponding to a third frame structure, and only when the third frame structure and the second frame structure have same subcarrier spacings and same CP lengths, the second synchronization channel corresponding to the second frame structure may be further corresponding to the third frame structure, that is, corresponding to the third service. That is, the second service and the third service share one synchronization channel. When the at least two services further include a fourth service, the fourth service is corresponding to a fourth frame structure, and the fourth frame structure and the second frame structure have same subcarrier spacings and different CP lengths, regardless of whether time-domain boundaries of the last symbols included in subframes are aligned, the fourth frame structure and the second frame structure do not share one synchronization channel, but a fourth synchronization channel corresponding to the fourth service is allocated to the fourth service on the same carrier. It may be understood that, a description is provided only by using an example in which the second service and another service share one synchronization channel, and when the foregoing relationship exists between the frame structure corresponding to the first service and that corresponding to the another service, the first service may also share the first synchronization channel with the another service. Either the first service or the second service is in a general sense. The terms "first" and "second" are used to distinguish between descriptions of the two services, and there is no other limitation.

It can be learned that, in the described rule of whether a synchronization channel is shared, for one thing, it is determined whether subcarrier spacings corresponding to services are the same. When the subcarrier spacings are different, the synchronization channel cannot be shared. When the subcarrier spacings are the same, it may be further determined whether time-domain boundaries of the last symbols in subframes in frame structures corresponding to the services are aligned. When the time-domain boundaries of the last symbols in the subframes are not aligned, the synchronization channel cannot be shared. Optionally, before the time-domain boundaries of the last symbols in the subframes of the frame structures corresponding to the services are determined, it may be determined whether CP lengths are the same. If the CP lengths are the same, the synchronization channel can be shared. If the CP lengths are different, it is further determined whether the time-domain boundaries of the last symbols in the subframes are aligned. When a looser sharing rule is used, if the time-domain boundaries of the last symbols in the subframes are aligned, the synchronization channel can be shared. When a stricter sharing rule is used, even if the time-domain boundaries of the last symbols in the subframes are aligned, the synchronization channel is not shared. To simplify synchronization channel allocation when a same carrier is used for multiple services, some modifications or supplementation can be made to an existing LTE protocol, so that in a new protocol, time-domain boundaries of the last symbols in subframes in frame structures corresponding to services that share a carrier are aligned. In this way, when a synchronization channel is configured, only subcarrier spacings of the services need to be considered. For example, a subframe length in the existing LTE protocol may be modified, so that in the new protocol, a subframe length is defined as N times of a least common multiple of symbol lengths (including CP lengths) of multiple services that may share a same carrier (a value of N is selected in positive integers greater than or equal to 1, and a specific value may be determined with consideration of another factor). In this way, time-domain boundaries of the last symbols in subframes in frame structures corresponding to the multiple services that share the same carrier can be aligned. Alternatively, a CP length in the existing LTE protocol may be supplemented or modified, so as to design a CP length in the new protocol for CP lengths of multiple services that may share a same carrier, so that time-domain boundaries of the last symbols in subframes in frame structures corresponding to the services are aligned. Alternatively, both a subframe length and a CP length in the existing LTE protocol are modified or supplemented, so that in the new protocol, time-domain boundaries of the last symbols in subframes in frame structures corresponding to services are aligned. A specific modification or supplementation manner is not described herein.

For the modification of the subframe length, for example, there are four services such as a unicast service, a multicast service, a narrowband MTC service, and a high-frequency wideband service.

A service feature of the unicast service is a 15 KHz subcarrier spacing and a normal CP, 1 ms has 14 symbols, and each symbol length is $1/14$ ms.

A service feature of the multicast service is a 15 KHz subcarrier spacing and an extended CP, 1 ms has 12 symbols, and each symbol length is $1/12$ ms.

A service feature of the narrowband MTC service is a 1.25 KHz subcarrier spacing and an extended CP, 1 ms has one symbol, and each symbol length is 1 ms.

A service feature of the high-frequency wideband service is a 3.75 KHz subcarrier spacing and an extended CP, 1 ms has three symbols, and each symbol length is $1/3$ ms.

A least common multiple is selected from the foregoing four symbol lengths (for example, $1/14$, $1/12$, 1, $1/3$) as 1 ms, and the subframe length may be selected as 2 ms, so as to be compatible with an existing case in which a subframe includes two timeslots including an even quantity of symbols.

Optionally, in another implementation, it may be determined, only by determining whether types of services transmitted on a same carrier are the same, whether a synchronization channel is shared. If the types of the services are different, different synchronization channels are allocated. If the types of the services are the same, a synchronization channel is shared.

Optionally, in another implementation, determining a frame structure of a service and determining a type of the service may be combined to determine whether a synchronization channel is shared. For details, refer to the descriptions in the foregoing embodiments. For example, the synchronization channel is shared when it is determined that the service types are the same. When it is determined that the service types are different, it is further determined whether frame structures of different services meet a condition for sharing the synchronization channel. Specifically, for whether the frame structures of the different services meet the condition for sharing the synchronization channel, refer to the foregoing descriptions.

Synchronization Channel Sending Occasion

In terms of a sending occasion of the first synchronization channel and that of the second synchronization channel, in an implementation, both the first synchronization channel and the second synchronization channel are periodically sent.

In this case, a UE side may perform synchronization with a corresponding synchronization channel according to a service received by the UE side, for example, perform synchronization with the first synchronization channel when the service is the first service, and perform synchronization with the second synchronization channel when the service is the second service. After the UE side is out of synchronization with a wireless network side, the UE side only needs to perform resynchronization with the corresponding synchronization channel according to the received service. In this way, the UE side can receive information only on a subband corresponding to the received service without receiving information on an entire carrier bandwidth.

Figure 10:
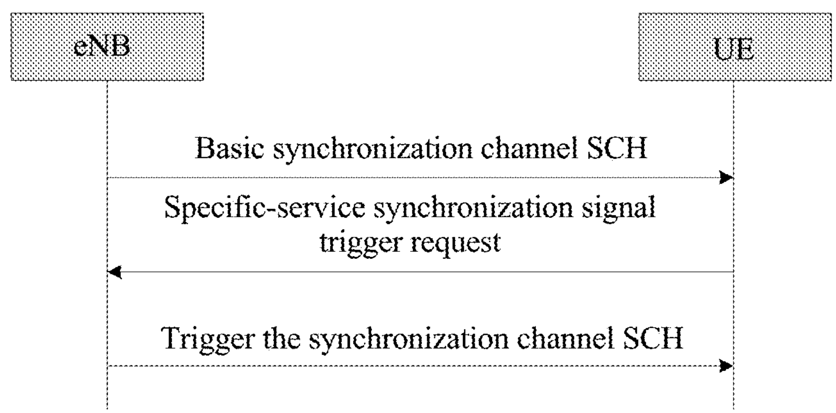
FIG. 10 is a schematic diagram of a procedure of triggering a specific service synchronization channel SCH according to an aspect of the present disclosure.

In another implementation, as shown in a procedure in FIG. 10, the first synchronization channel is periodically sent, and the second synchronization channel is sent according to a synchronization request sent by the UE. Further, the second synchronization channel may be set to be sent within a time window. The time window is enabled when the synchronization request of the UE is received. The time window is disabled when a time period T set by the time window ends. On the UE side, when the UE sends the synchronization request, the time window is enabled. When the time period T set by the time window ends, if synchronization fails, the UE sends the synchronization request again, triggers enabling of the time window, and after synchronization succeeds, stops sending the synchronization request to trigger the enabling of the time window. When the first synchronization channel is periodically sent, and the second synchronization channel is sent according to the synchronization request sent by the UE, on the UE side, the UE side may perform synchronization by using the first synchronization channel, and after the synchronization, the UE sends the synchronization request to the eNB when the UE needs to receive another service. Usually, a higher layer of the UE knows a specific service that needs to be subsequently received by the UE. If there is no need, synchronization may be performed according to a unicast service. After receiving the synchronization request, the eNB sends the second synchronization channel corresponding to the service, for example, sends the second synchronization channel on the subband on which the service is located, or adds, to the previously sent first synchronization channel, synchronization information (which may also be considered as the second synchronization channel) required for receiving the another service by the UE. Optionally, a service request sent by the UE may include service identification information, so that the eNB determines to send a synchronization channel corresponding to which service. In this case, when the UE side is out of synchronization, the UE side may search on a frequency band of the service, and if there is a synchronization signal of the service, the UE side performs synchronization with the service. If there is no synchronization signal of the service on the frequency band of the service, the UE side first performs synchronization with a basic synchronization channel such as a legacy synchronization channel, and then sends a synchronization request of the service to request the eNB to send a synchronization channel of the service, so as to implement synchronization.

In this way, the UE may implement synchronization with services of different types, and reduce overheads of the synchronization channel.

Preferably, the first synchronization channel is a legacy synchronization channel, and the second synchronization channel is a synchronization channel corresponding to another service. In this way, compatibility of UE that does not support a multi-service synchronization channel may be ensured, and the UE that does not support the multi-service synchronization channel may still use a previous access manner.

UE Side

The UE receives at least two synchronization channels sent by the eNB, and implements, according to service frame structures, service types, or terminal types of the synchronization channels by using the corresponding synchronization channels, downlink time synchronization and frequency synchronization with corresponding subbands. For example, when the synchronization channels are transmitted in a frequency division multiplexing manner, an example in which a basis is the service type is used. When the service type is a first type, the UE may implement, by using a first synchronization channel, downlink time synchronization and frequency synchronization with a first subband (a subband 1). When the service type is a second type, the UE may implement, by using a second synchronization channel, downlink time synchronization and frequency synchronization with a second subband (a subband 2). Then, the UE may send and receive a service only on the corresponding synchronized subband. For another example, when the synchronization channels are transmitted in a time division multiplexing manner, when the service type is a first type, the UE may implement, by using a first synchronization channel, downlink time synchronization and frequency synchronization with a first subband (a subband 1). When the service type is a second type, the UE may implement, by using a second synchronization channel, downlink time synchronization and frequency synchronization with a first subband (a subband 1).

In a specific alternative manner, the UE determines a specific service that the UE needs to access, and then performs, according to a subcarrier spacing, a sequence, and the like corresponding to the service, related processing with a synchronization channel sent by the eNB, so as to synchronize with a corresponding subband. The UE may scan the entire carrier, or may scan the subband of the service with knowing the subband of the service.

The terminal type may be corresponding to a service feature. For example, for a narrowband MTC terminal, a service of the terminal is a narrowband MTC service, and a terminal type of the terminal determines a service feature.

Optionally, in an implementation, before the UE receives the second synchronization channel, the UE implements downlink time synchronization and frequency synchronization according to the first synchronization channel. The UE may further send a synchronization request to the eNB according to a service frame structure, a service type, or a terminal type of a service that needs to be received by the UE, to trigger the eNB to deliver the second synchronization channel. Optionally, after sending the request, the UE may set a time period. If synchronization fails in the time period, the UE may send the request again and set the time period again; or if synchronization succeeds, stop sending the request.

Optionally, in an implementation, when the UE is not sure of a service type of the UE (for example, when UE that temporarily has no service need or idle-state UE needs to camp on a cell), the UE may first perform synchronization according to one synchronization channel, for example, perform synchronization according to the first synchronization channel. This can be set and implemented on the UE side. Preferably, the first synchronization channel is a legacy synchronization channel, and the second synchronization channel is a synchronization channel corresponding to a service of another type. In this way, the UE may first perform synchronization according to a relatively basic synchronization channel, and then send a synchronization request to a wireless network device according to a service frame structure, a service type, or a terminal type that are determined by the UE, to trigger the wireless network device to deliver the second synchronization channel. In this way, the UE may implement synchronization with different services, and reduce overheads of the synchronization channel. Optionally, after performing synchronization according to the legacy synchronization channel, if the UE wants to receive another service, the UE may further receive the another service according to an offset used for time synchronization, such as a symbol synchronization offset, and/or an offset used for frequency synchronization, such as an offset of a central frequency channel number of a frequency band corresponding to the another service, where the difference values are notified by the eNB. Optionally, the notification of the eNB may be completed by using RRC (radio resource control, radio resource control) signaling or physical layer signaling. Optionally, the notification of the eNB may be sent at a request of the UE.

In this case, when the UE is out of synchronization with an eNB, the UE may directly search on a subband of the service, and if there is a synchronization signal of the service, the UE performs synchronization with the synchronization signal of the service. If there is no synchronization signal of the service on the subband of the service, the UE first performs synchronization with a legacy synchronization channel, and then sends a synchronization request of the service to request the eNB to send a synchronization channel of the service, so as to implement synchronization.

Figure 12:
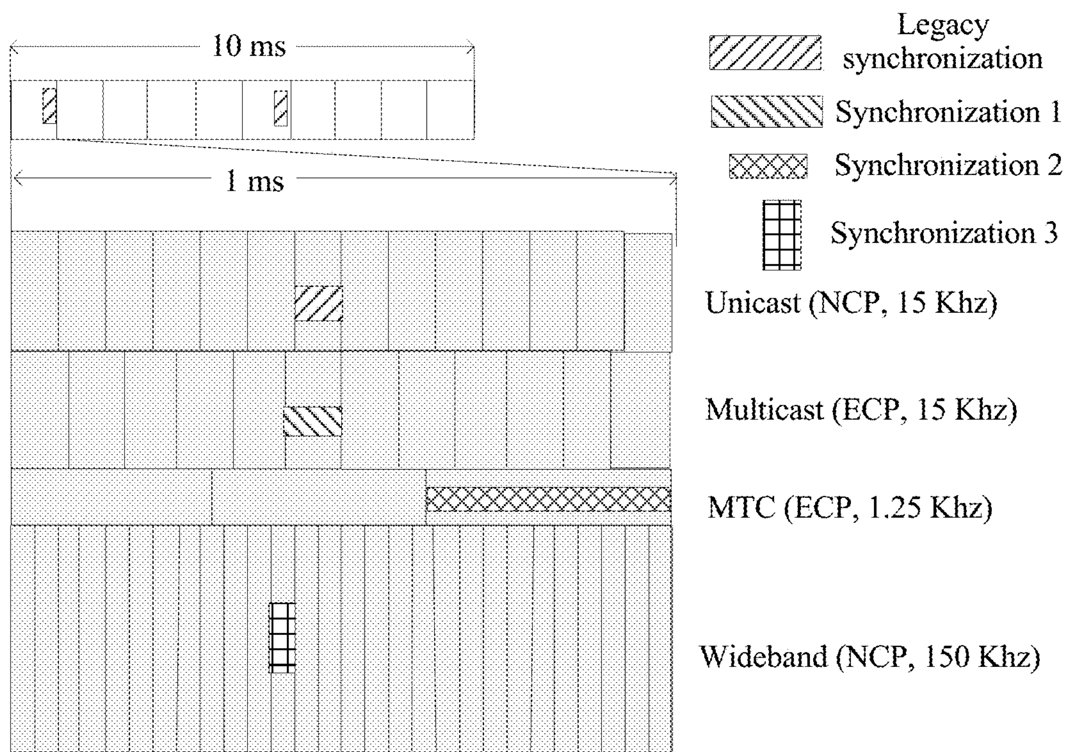
FIG. 12 is a schematic diagram of four synchronization signals sent by an eNB and frame structures of four services in a scenario in FIG. 11 according to an aspect of the present disclosure.

For example, as shown in FIG. 11 and FIG. 12, for example, there are three UEs UE A, UE B, and UE C of an eNodeB eNB. A current service of the UE A is an MTC service (ECP, 1.25 KHz). A current service of the UE B is a multicast service (ECP, 15 KHz). The UE C has two types of current services, which are respectively a unicast service (NCP, 15 KHz) and a wideband service (NCP, 150 KHz). In FIG. 12, illustration is provided by using an example in which a subframe length is 1 ms.

The eNB sends four synchronization signals in a subframe on a 20 M carrier according to a current requirement. The synchronization signals are respectively four synchronization signals in FIG. 12. The four synchronization signals are respectively corresponding to four service frame structures: a narrowband subcarrier spacing 1.25 KHz (a narrowband MTC service); a subcarrier spacing 15 KHz, an extended CP (a multicast service); a subcarrier spacing 15 KHz, a normal CP (a unicast service); and a wideband subcarrier spacing 150 KHz (a wideband service). In addition, at least one of time-frequency locations, resource mappings, or corresponding sequences of the four synchronization signals are different from each other. For example, that time-frequency locations are different may include: occupied bandwidths are different, or relative locations of time-domain resources are different (for example, a symbol interval between primary synchronization signals and that between secondary synchronization signals are different). For example, the resource mapping may be a feature that a signal is mapped to a subcarrier or a symbol. Optionally, designs of synchronization signals may be different. For example, a synchronization signal may include only a primary synchronization signal, include only a secondary synchronization signal, or include both primary and secondary synchronization signals.

The following provides a description by using an example in which the corresponding sequences are different.

During first access, the UE A performs blind detection on the 20 M carrier according to the current service: the MTC service, and determines, according to the subcarrier spacing 1.25 KHz and a corresponding sequence, that a frequency band on which the third synchronization signal on the carrier is a frequency band that needs to be accessed. Specifically, the UE knows in advance multiple synchronization sequences corresponding to the frame structure; performs related processing by using the sequences; determines whether the synchronization signal is a synchronization signal of the service; and learns, by using a broadcast signal, that a bandwidth of the current accessed frequency band is 1.4 M, and that subsequent service data is transmitted only on the 1.4 M. The UE may further obtain information such as a cell ID and a CP length by means of synchronization. When the UE A is out of synchronization, the UE A may implement synchronization with the eNB by performing blind detection only on this 1.4 M frequency domain resource.

During first access, the UE B performs blind detection on the 20 M carrier according to the current service: the multicast service, and determines, according to 15 KHz and a corresponding sequence, that a frequency band on which the second synchronization signal on the carrier is a frequency band that needs to be accessed. Specifically, the UE knows in advance multiple synchronization sequences corresponding to the frame structure; performs related processing by using the sequences; determines whether the synchronization signal is a synchronization signal of the service; and learns, by using a broadcast signal, that a bandwidth of the current accessed frequency band is 3 M, and that subsequent service data is transmitted only on the 3 M. The UE may further obtain information such as a cell ID and a CP length by means of synchronization. When the UE B is out of synchronization, the UE B may implement synchronization with the eNB by performing blind detection only on this 3 M frequency domain resource.

During first access, the UE C performs blind detection on the 20 M carrier according to the current services: the unicast service and the wideband service, and determines, according to 15 KHz and a corresponding sequence, that a frequency band on which the first synchronization signal on the carrier is a frequency band that needs to be accessed. In addition, the UE C continues to detect a remaining bandwidth part, and determines, according to 150 KHz and a corresponding sequence, that a frequency band on which the fourth synchronization signal on the carrier is also a frequency band that needs to be accessed. The UE C learns, by using a broadcast signal, that a bandwidth of the accessed band of the unicast service is 5 M, that subsequent unicast service data is transmitted only on the 5 M, that a bandwidth of the accessed band of the wideband service is 10 M, and that subsequent wideband service data is transmitted only on the 10 M. When the unicast service of the UE C is out of synchronization, the UE C may implement synchronization with the eNB by performing blind detection only on the first 5 M frequency domain resource. When the wideband service of the UE C is out of synchronization, the UE C may implement synchronization with the eNB by performing blind detection only on the last 10 M frequency domain resource.

Figure 13:
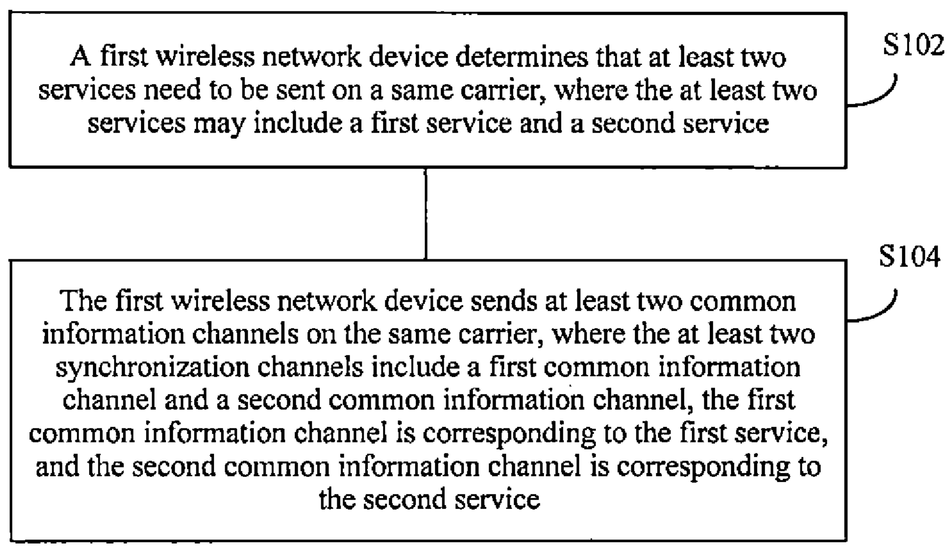
FIG. 13 is a schematic flowchart of a common information sending method according to an aspect of the present disclosure.

The present disclosure provides a common information sending method. The method is described from a perspective of a transmit side, and as shown in FIG. 13, may include the following step:

S104. A first wireless network device sends at least two channels for common information on a same carrier.

The at least two synchronization channels include a first channel for common information and a second channel for common information.

Optionally, the first channel for common information and the second channel for common information are on different subbands of the same carrier.

Optionally, before S104, the method may include: determining, by the first wireless network device, that at least two services need to be sent on the same carrier, where the at least two services may include a first service and a second service.

Optionally, the first wireless network device determines that a first frame structure corresponding to the first service and a second frame structure corresponding to the second service are different, or that a type of the first service and that of the second service are different.

The first channel for common information is corresponding to the first service, and the second channel for common information is corresponding to the second service. Common information includes at least one of a synchronization signal, a broadcast message, or a system message.

For example, the first service is a unicast service, and the second service is a narrowband MTC service.

For specific descriptions, such as a case in which a channel for common information is corresponding to a service, a channel for common information sending occasion, resource configuration, or sharing of a channel for common information of another service, refer to descriptions in other embodiments of the present disclosure. Details are not described herein again.

A channel for common information corresponding to a service is sent, so that a second wireless network device can receive common information required for transmitting the service, and further receive and send subsequent service data from and to a first wireless network device.

Figure 14:
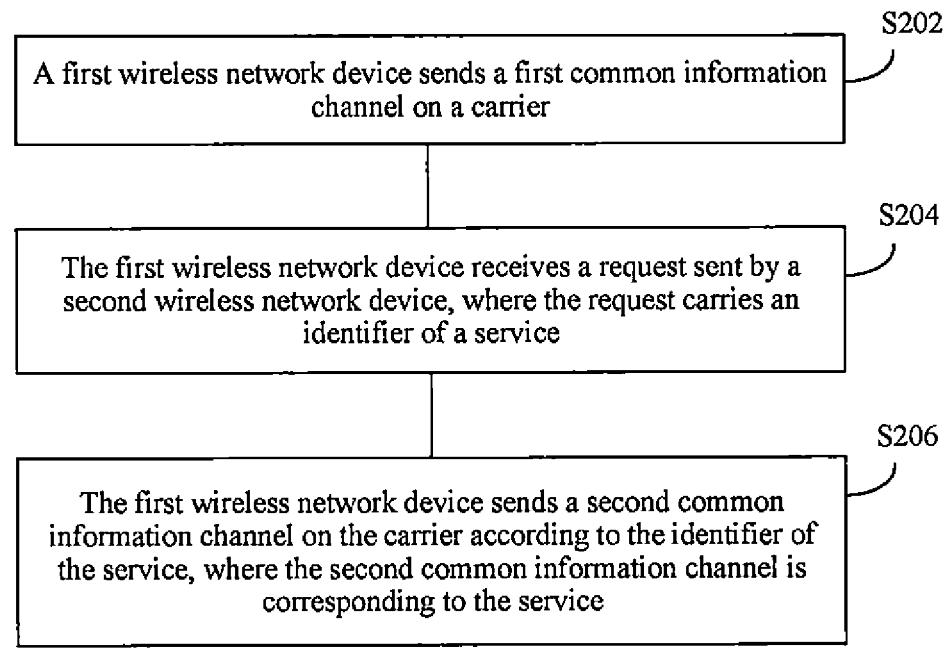
FIG. 14 is a schematic flowchart of a common information sending method according to an aspect of the present disclosure.

The present disclosure further provides a common information sending method. The method is described from a perspective of a transmit side, and as shown in FIG. 14, may include the following steps:

S202. A first wireless network device sends a first channel for common information on a carrier.

S204. The first wireless network device receives a request sent by a second wireless network device, where the request carries an identifier of a service.

S206. The first wireless network device sends a second channel for common information on the carrier according to the identifier of the service, where the second channel for common information is corresponding to the service.

Common information includes at least one of a synchronization signal, a broadcast message, or a system message.

Further, the first wireless network device transmits the service on the carrier.

For specific descriptions, such as a case in which the second channel for common information is corresponding to the service, a case in which the first channel for common information is a basic channel for common information, or time-frequency resource or codeword resource configuration, refer to descriptions in other embodiments of the present disclosure. Details are not described herein again.

Optionally, the second channel for common information and the first channel for common information may be independent, or common information required for accessing a corresponding service may be added to the first channel for common information, such as one or more of a time domain offset, a frequency domain offset, or other information, to obtain the second channel for common information (optionally, in this case, the first channel for common information still exists). For this point, still refer to the descriptions in the other embodiments of the present disclosure. Details are not described herein again.

The present disclosure provides a common information transmission method. The method is described from a perspective of a receive side, and may include the following step:

S302. A second wireless network device receives a channel for common information according to a feature of a service that needs to be received.

Common information includes at least one of a synchronization signal, a broadcast message, or a system message.

Optionally, the feature of the service includes a frame structure of the service, a type of the service, or a type of the second wireless network device (for example, when the type of the wireless network device is related to the type of the service).

Optionally, the second wireless network device may be UE.

It may be understood that, a relationship between the feature of the service and a frame structure of the channel for common information on a second wireless network device side is consistent with a relationship between the feature of the service and a frame structure of the channel for common information on a first wireless network device side. In this way, it can be ensured that the second wireless network device side correctly receives the channel for common information.

In this embodiment of the present disclosure, receiving of the channel for common information is related to the feature of the service, so that the second wireless network device can selectively receive the channel for common information according to the feature of the service. For example, in a case of frequency synchronization and time out-of-synchronization, the second wireless network device synchronizes with a frequency band corresponding to a feature of a specific service that is accessed. In this way, information about another frequency band may not be received, complexity of the second wireless network device can be reduced, and power can be saved.

In a possible implementation in this embodiment of the present disclosure, S302 may be specifically:

receiving, by the second wireless network device, a second channel for common information according to a feature of a second service that needs to be received.

Further, S302 may further include:

receiving, by the second wireless network device, a first channel for common information according to a feature of a first service that needs to be received.

The first service and the second service are transmitted on a same carrier. The first channel for common information and the second channel for common information are also transmitted on the carrier on which the first service and the second service are transmitted.

In another possible implementation in this embodiment of the present disclosure, before S302, the method may further include the following step:

S301. The second wireless network device sends a request for the channel for common information to a first wireless network device according to the feature of the service that needs to be received.

Before S301, the method may further include the following step:

S300. The second wireless network device receives a first channel for common information. In this case, the channel for common information in S302 is specifically a second channel for common information.

The second channel for common information is corresponding to a feature of a second service.

A structure of the first channel for common information and that of the second channel for common information are different. For specific descriptions, such as a case in which a channel for common information is corresponding to a service, a channel for common information sending occasion, resource configuration, or sharing of a channel for common information of another service, refer to descriptions in other embodiments of the present disclosure. Details are not described herein again.

Optionally, the second channel for common information and the first channel for common information may be independent, or common information required for accessing a corresponding service may be added to the first channel for common information, such as one or more of a time domain offset, a frequency domain offset, or other information, to obtain the second channel for common information (optionally, in this case, the first channel for common information still exists). For this point, still refer to the descriptions in the other embodiments of the present disclosure. Details are not described herein again.

Figure 15:
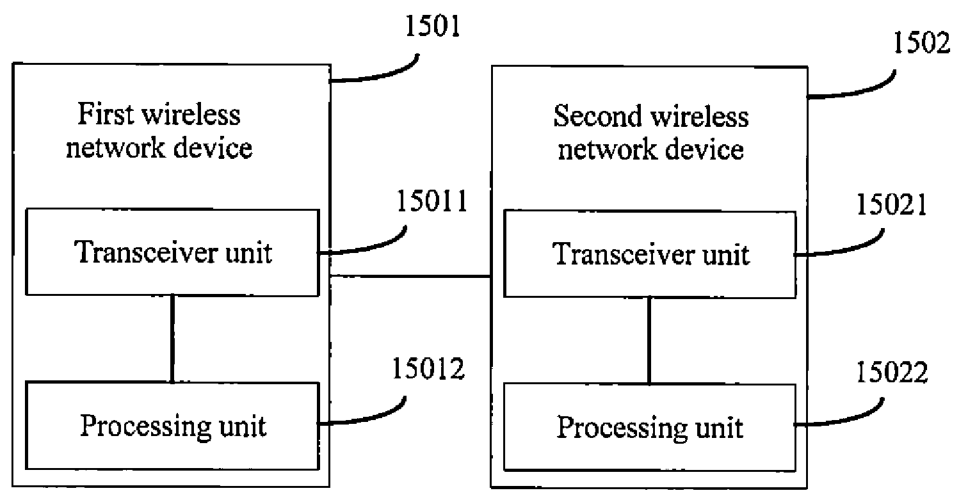
FIG. 15 is a schematic structural diagram of a communications system according to an aspect of the present disclosure.

The present disclosure provides a communications system. As shown in FIG. 15, the system includes the first wireless network device 1501 and the second wireless network device 1502. In a scenario, the first wireless network device is a base station, and the second wireless network device is a terminal. In another scenario, the first wireless network device is a macro base station, and the second wireless network device is a micro base station, such as an access point AP. In still another scenario, the first wireless network device is a first terminal, and the second wireless network device is a second terminal.

For concepts, explanations, and detailed descriptions related to the technical solutions provided in this embodiment of the present disclosure, refer to the descriptions of the content in the method or other embodiments. Details are not described herein again.

Optionally, as shown in FIG. 15, the first wireless network device may include a transceiver unit 15011 and a processing unit 15012. The wireless network device may be a base station, or may be a terminal.

In a possible implementation, the processing unit 15012 is configured to use the transceiver unit 15011 to send at least two channels for common information on a same carrier. The at least two synchronization channels include a first channel for common information and a second channel for common information.

Optionally, the first channel for common information and the second channel for common information are on different subbands.

Further, the processing unit 15012 may be further configured to determine that services that need to be sent on the same carrier include at least two services. The at least two services may include a first service and a second service. The first service is corresponding to the first channel for common information, and the second service is corresponding to the second channel for common information.

Common information includes at least one of a synchronization signal, a broadcast message, or a system message.

For specific descriptions of the functions of the transceiver unit or those of the processing unit, such as a case in which a channel for common information is corresponding to a service, a channel for common information sending occasion, resource configuration, or sharing of a channel for common information of another service, refer to descriptions in other embodiments of the present disclosure. Details are not described herein again.

A channel for common information corresponding to a service is sent, so that a second wireless network device can receive common information required for transmitting the service, and further receive and send subsequent service data from and to a first wireless network device.

In another possible implementation, the transceiver unit 15011 is configured to: send a first channel for common information on a carrier, and receive a request sent by the second wireless network device. The request carries an identifier of a service.

The processing unit 15012 is configured to use the transceiver unit 15011 to send a second channel for common information on the carrier according to the identifier of the service. The second channel for common information is corresponding to the service.

Further, the transceiver unit 15011 is further configured to transmit the service on the carrier.

For specific descriptions or functions of the processing unit and the transceiver unit, such as a case in which the second channel for common information is corresponding to the service, a case in which the first channel for common information is a basic channel, or time-frequency resource or codeword resource configuration, refer to descriptions of the first wireless network device or the base station in other embodiments of the present disclosure. Details are not described herein again.

It may be understood that, in an implementation, it may be considered that the functions of the transceiver unit may be implemented by using a transceiver circuit or a dedicated transceiver chip. It may be considered that the processing unit may be implemented by using a dedicated processing chip, a processing circuit, a processor, or a universal chip.

In another implementation, it may be considered that a wireless access device provided in this embodiment of the present disclosure may be implemented by using a general-purpose computer. That is, program code for implementing the functions of the transceiver unit and those of the processing unit is stored in a memory, and a processor implements the functions of the transceiver unit and those of the processing unit by executing the code in the memory.

Optionally, the first wireless network device may further include a common part such as a memory and/or a bus. Details are not described herein.

Optionally, as shown in FIG. 15, the second wireless network device includes a transceiver unit 15021 and a processing unit 15022. The wireless network device may be a terminal, or may be a base station.

The processing unit 15022 is configured to use the transceiver unit 15021 to receive a channel for common information according to a feature of a service that needs to be received.

In a possible implementation in this embodiment of the present disclosure, the processing unit may be specifically configured to use the transceiver unit to receive a second channel for common information according to a feature of a second service that needs to be received.

The processing unit may be further configured to use the transceiver unit to receive a first channel for common information according to a feature of a first service that needs to be received.

The first service and the second service are transmitted on a same carrier. The first channel for common information and the second channel for common information are also transmitted on the carrier on which the first service and the second service are transmitted.

In another possible implementation in this embodiment of the present disclosure, the processing unit may be further configured to use the transceiver unit to send a request for the channel for common information to the first wireless network device according to the feature of the service that needs to be received.

Further, the processing unit may be further configured to use the transceiver unit to receive a first channel for common information. In this case, the channel for common information is specifically a second channel for common information.

The second channel for common information is corresponding to a feature of a second service.

A frame structure of the first channel for common information and that of the second channel for common information are different. For related definitions, disclosures, and detailed descriptions, such as the functions of the transceiver unit or those of the processing unit, a case in which a channel for common information is corresponding to a service, a channel for common information sending occasion, resource configuration, or sharing of a channel for common information of another service, refer to descriptions of the second wireless network device or the UE in other embodiments of the present disclosure. Details are not described herein again.

Optionally, the second channel for common information and the first channel for common information may be independent, or common information required for accessing a corresponding service may be added to the first channel for common information, such as one or more of a time domain offset, a frequency domain offset, or other information, to obtain the second channel for common information (optionally, in this case, the first channel for common information still exists). For this point, still refer to the descriptions in the other embodiments of the present disclosure. Details are not described herein again.

In an implementation, it may be considered that the functions of the transceiver unit may be implemented by using a transceiver circuit or a dedicated transceiver chip. It may be considered that the processing unit may be implemented by using a dedicated processing chip, a processing circuit, a processor, or a universal chip.

In another implementation, it may be considered that a wireless access device provided in this embodiment of the present disclosure may be implemented by using a general-purpose computer. That is, program code for implementing the functions of the transceiver unit and those of the processing unit is stored in a memory, and a processor implements the functions of the transceiver unit and those of the processing unit by executing the code in the memory.

Optionally, the second wireless network device may further include a common part such as a memory and/or a bus. Details are not described herein.

It should also be understood that the terms "first", "second", "third", "fourth", and various numerical numbers in this specification are used to perform distinguishing merely for convenient description, and are not intended to limit the scope of the embodiments of the present disclosure.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that at least one or more of A, B, or C in this specification includes A; B; C; A and B; A and C; B and C; or A, B, and C. Similarly, a meaning of at least one of multiple items such as two or four items, such as at least one or more of A or B, or at least one or more of A, B, C, or D, may be deduced. Details are not described herein.

It should be understood that in this specification, for a reason of the language, a conjunction "of" in B of A may sometimes be omitted, and B of A may be abbreviated to AB, and B corresponding to A may sometimes be abbreviated to B of A. If a distinction between the terms is not specially specified, meaning indications expressed by the terms are basically the same.

It should be understood that in this specification, for a reason of the language, a channel, a signal, a message, and information may sometimes indicate a same meaning. If a distinction between them is not specifically specified, meaning indications expressed by them are basically the same.

It should be understood that in this specification, for a reason of the language, there may be mixtures of some other words, and the mixtures are understandable and unquestionable to persons skilled in the art. Details are not described herein.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

With reference to the first aspect, in a first possible implementation, the common information includes at least one of a synchronization signal, a broadcast signal, or a system message.

With reference to the first aspect or the first possible implementation of the first aspect, in a second possible implementation of the first aspect, the first channel for common information has a first subcarrier spacing and a first cyclic prefix length, the second channel for common information has a second subcarrier spacing and a second cyclic prefix length, the first subcarrier spacing and the second subcarrier spacing are different, and the first cyclic prefix length and the second cyclic prefix length are different.

With reference to the first aspect or the first possible implementation of the first aspect, in a third possible implementation of the first aspect, the first channel for common information has a first subcarrier spacing and a first cyclic prefix length, the second channel for common information has a second subcarrier spacing and a second cyclic prefix length, the first subcarrier spacing and the second subcarrier spacing are the same, and the first cyclic prefix length and the second cyclic prefix length are different.

With reference to any one of the first aspect, or the first to the third possible implementations of the first aspect, in a fourth possible implementation of the first aspect, the first channel for common information and the second channel for common information are on middle resource blocks on the different subbands.

With reference to any one of the first aspect, or the first to the fourth possible implementations of the first aspect, in a fifth possible implementation of the first aspect, at least two channels for service are included in the same carrier, the at least two channels for service include a first channel for service and a second channel for service, the first service has a first service feature, the second service has a second service feature, the first service feature includes a frame structure of the first service or a type of the first service, and the second service feature includes a frame structure of the second service or a type of the second service; and the first channel for service is corresponding to the first channel for common information, and the second channel for service is corresponding to the second channel for common information.

With reference to the fifth possible implementation of the first aspect, in a sixth possible implementation of the first aspect, the frame structure of the first service includes a first service subcarrier spacing, a first service cyclic prefix length, and a subband on which the first service is located; and that the first channel for service is corresponding to the first channel for common information includes:

(1) the first service subcarrier spacing and the first subcarrier spacing are the same, and the first service CP length and the first CP length are the same; or the first service subcarrier spacing and the first subcarrier spacing are the same, and the first service CP length and the first CP length are different; and (2) the subband on which the first service is located and the subband on which the first channel for common information is located are the same.

With reference to the fifth or the sixth possible implementation of the first aspect, in a seventh possible implementation of the first aspect, the frame structure of the second service includes a second service subcarrier spacing, a second service cyclic prefix length, and a subband on which the second service is located; and that the second channel for service is corresponding to the second channel for common information includes:

(1) the second service subcarrier spacing and the second subcarrier spacing are the same, and the second service CP length and the second CP length are the same; or the second service subcarrier spacing and the second subcarrier spacing are the same, and the second service CP length and the second CP length are different; and (2) the subband on which the second service is located and the subband on which the second channel for common information is located are the same.

With reference to any one of the fifth to the seventh possible implementations of the first aspect, in an eighth possible implementation of the first aspect, the at least two channels for service further include a third channel for service, the third service has a third service feature, the third service feature includes a frame structure of the third service or a type of the third service, and the second channel for common information is also corresponding to the third service feature.

With reference to the eighth possible implementation of the first aspect, in a ninth possible implementation of the first aspect, the frame structure of the third service includes a third service subcarrier spacing, a third service cyclic prefix length, and a subband on which the third service is located, and the subband on which the third service is located and the subband on which the second channel for common information is located are different; and that the second channel for common information is also corresponding to the third channel for service includes:

the third service subcarrier spacing and the second subcarrier spacing are the same, and the third service CP length and the second CP length are the same; or the third service subcarrier spacing and the second subcarrier spacing are the same, and the third service CP length and the second CP length are different.

With reference to the third aspect, in a first possible implementation of the third aspect, the wireless network device is a base station or a terminal.

According to a fourth aspect, an embodiment of the present disclosure provides a data transmission method, including:

sending, by a first wireless network device, at least two channels for common information on a same carrier, where the at least two channels for common information include a first channel for common information and a second channel for common information, and the first channel for common information and the second channel for common information are on different subbands of the same carrier.

With reference to the fourth aspect, in a first possible implementation of the fourth aspect, the first channel for common information is corresponding to a first service, and the second channel for common information is corresponding to a second service.

With reference to the first possible implementation of the fourth aspect, in a second possible implementation of the fourth aspect, before the sending at least two channels for common information, the method further includes:

determining, by the first wireless network device, that at least two services need to be transmitted on the same carrier, where the at least two services include the first service and the second service; a frame structure of the first service includes a first service subcarrier spacing, a first service cyclic prefix length, and a subband on which the first service is located; and a frame structure of the second service includes a second service subcarrier spacing, a second service cyclic prefix length, and a subband on which the second service is located.

With reference to the fourth aspect, or the first or the second possible implementation of the fourth aspect, in a third possible implementation of the fourth aspect, the common information includes at least one of a synchronization signal, a broadcast signal, or a system message.

With reference to any one of the first to the third possible implementations of the fourth aspect, in a fourth possible implementation of the fourth aspect, the frame structure of the first service and that of the second service are different; or a type of the first service and that of the second service are different.

With reference to the fourth possible implementation of the fourth aspect, in a fifth possible implementation of the fourth aspect, that the frame structure of the first service and that of the second service are different includes: the subband on which the first service is located and the subband on which the second service is located are different.

With reference to the fifth possible implementation of the fourth aspect, in a sixth possible implementation of the fourth aspect, that the frame structure of the first service and that of the second service are different includes: the first service subcarrier spacing and the second service subcarrier spacing are different, and the first service CP length and the second service CP length are different; or the first service subcarrier spacing and the second service subcarrier spacing are the same, and the first service CP length and the second service CP length are different.

With reference to any one of the first to the sixth possible implementations of the fourth aspect, in a seventh possible implementation of the fourth aspect, a structure of the first channel for common information includes a first subcarrier spacing, a first cyclic prefix length, a first time domain resource, and a first frequency domain resource; and that the first channel for common information is corresponding to a first service includes:

(1) the first service subcarrier spacing and the first subcarrier spacing are the same, and the first service CP length and the first CP length are the same; or the first service subcarrier spacing and the first subcarrier spacing are the same, and the first service CP length and the first CP length are different; and (2) the first service subband and a first subband are the same.

With reference to any one of the first to the sixth possible implementations of the fourth aspect, in an eighth possible implementation of the fourth aspect, a structure of the first channel for common information includes a first subcarrier spacing, a first cyclic prefix length, and a first subband on which the first channel for common information is located; and that the first channel for common information is corresponding to a first service includes:

(1) the first service subband and the first subband are different; and (2) the first service subcarrier spacing and the first subcarrier spacing are the same, and the first service CP length and the first CP length are the same; or the first service subcarrier spacing and the first subcarrier spacing are the same, and the first service CP length and the first CP length are different; where optionally, the first common information includes information about the first service subband.

With reference to any one of the first to the eighth possible implementations of the fourth aspect, in a ninth possible implementation of the fourth aspect, a structure of the second channel for common information includes a second subcarrier spacing, a second cyclic prefix length, and a second subband on which the second channel for common information is located; and that the second channel for common information is corresponding to a second service includes:

(1) the second service subcarrier spacing and the second subcarrier spacing are the same, and the second service CP length and the second CP length are the same; or the second service subcarrier spacing and the second subcarrier spacing are the same, and the second service CP length and the second CP length are different; and (2) the second service subband and the second subband are the same.

With reference to any one of the first to the eighth possible implementations of the fourth aspect, in a tenth possible implementation of the fourth aspect, a structure of the second channel for common information includes a second subcarrier spacing, a second cyclic prefix length, and a second subband on which the second channel for common information is located; and that the second channel for common information is corresponding to a second service includes:

(1) the second service subband and the second subband are different; and (2) the second service subcarrier spacing and the second subcarrier spacing are the same, and the second service CP length and the second CP length are the same; or the second service subcarrier spacing and the second subcarrier spacing are the same, and the second service CP length and the second CP length are different; where optionally, the second common information includes information about the second service subband.

With reference to the tenth possible implementation of the fourth aspect, in an eleventh possible implementation of the fourth aspect, the at least two services further include a third service, and the second channel for common information is further corresponding to the third service; where a type of the third service and the type of the second service are the same; or a frame structure of the third service includes a third service subcarrier spacing, a third service cyclic prefix length, and a third service subband on which the third service is located; and the frame structure of the second service includes the second service subcarrier spacing, the second service cyclic prefix length, and the subband on which the second service is located; where (1) the third service subband and the second service subband are different; and (2) the third service subcarrier spacing and the second service subcarrier spacing are the same, and the third service CP length and the second service CP length are the same; or the third service subcarrier spacing and the second service subcarrier spacing are the same, the third service CP length and the second service CP length are different, and a time-domain boundary of the last symbol in a subframe in the frame structure of the third service is aligned with that of the last symbol in a subframe in the frame structure of the second service.

With reference to the eleventh possible implementation of the fourth aspect, in a twelfth possible implementation of the fourth aspect, that the second channel for common information is further corresponding to the third service includes:

the second common information includes information about the third service subband.

With reference to any one of the fourth aspect, or the first to the twelfth possible implementations of the fourth aspect, in a thirteenth possible implementation of the fourth aspect, the method further includes:

receiving, by the first wireless network device, a second channel for common information request sent by a second wireless network device; and sending, by the first wireless network device, the second channel for common information based on the second channel for common information request.

With reference to the thirteenth possible implementation of the fourth aspect, in a fourteenth possible implementation of the fourth aspect, the second channel for common information request is used to trigger sending the second channel for common information within a time window.

With reference to the thirteenth or the fourteenth possible implementation of the fourth aspect, in a fifteenth possible implementation of the fourth aspect, the second channel for common information request includes an identifier of the second service.

With reference to any one of the thirteenth to the fifteenth possible implementations of fourth aspect, in a sixteenth possible implementation of the fourth aspect, before receiving the second channel for common information request, the first wireless network device further sends a fourth channel for common information on the same carrier, where the fourth channel for common information is a basic channel for common information, and a structure of the fourth channel for common information and the structure of the second channel for common information are different.

With reference to the sixteenth possible implementation of the fourth aspect, in a seventeenth possible implementation of the fourth aspect, the structure of the fourth channel for common information includes a fourth subcarrier spacing, a fourth cyclic prefix length, and a fourth subband on which the fourth channel for common information is located; and the structure of the second channel for common information includes the second subcarrier spacing, the second cyclic prefix length, and the second subband on which the second channel for common information is located; where that a structure of the fourth channel for common information and the structure of the second channel for common information are different includes:

(1) the fourth subcarrier spacing and the second subcarrier spacing are different, and the fourth CP length and the second CP length are different; or the fourth subcarrier spacing and the second subcarrier spacing are the same, and the first CP length and the second CP length are different; and (2) the fourth subband and the second subband are different.

In a first possible implementation of the fifth aspect, the wireless network device is a base station.

With reference to the first possible implementation of the sixth aspect, in a second possible implementation of the sixth aspect, the frame structure of the second service includes a second service subcarrier spacing, a second service cyclic prefix length, and a second service subband on which the second service is located; and a structure of the second channel for common information includes a second subcarrier spacing, a second cyclic prefix length, and a second subband on which the second channel for common information is located; where that the second channel for common information is corresponding to the frame structure of the second service includes:

(1) the second service subband and the second subband are the same; and (2) the second service subcarrier spacing and the second subcarrier spacing are the same, and the second service CP length and the second CP length are the same; or the second service subcarrier spacing and the second subcarrier spacing are the same, and the second service CP length and the second CP length are different; or (1) the second service subband and the second subband are different; and (2) the second service subcarrier spacing and the second subcarrier spacing are the same, and the second service CP length and the second CP length are the same; or the second service subcarrier spacing and the second subcarrier spacing are the same, and the second service CP length and the second CP length are different.

With reference to the sixth aspect, or the first or the second possible implementation of the sixth aspect, in a third possible implementation of the sixth aspect, the common information includes at least one of a synchronization signal, a broadcast signal, or a system message.

With reference to any one of the sixth aspect, or the first to the third possible implementations of the sixth aspect, in a fourth possible implementation of the sixth aspect, the method further includes:

receiving, by the second wireless network device, a third channel for common information according to a feature of a third service that needs to be received, where the third channel for common information is corresponding to the third service, the third service and the second service are transmitted on a same carrier, and the third channel for common information and the second channel for common information are also transmitted on the carrier on which the third service and the second service are located.

With reference to the fourth possible implementation of the sixth aspect, in a fifth possible implementation of the sixth aspect, that the feature of the third service and the feature of the second service are different specifically includes:

a frame structure of the third service and the frame structure of the second service are different; or a type of the third service and the type of the second service are different.

With reference to the fifth possible implementation of the sixth aspect, in a sixth possible implementation of the sixth aspect, the frame structure of the third service includes a third service subcarrier spacing, a third service cyclic prefix length, and a third service subband on which the third service is located; and the frame structure of the second service includes the second service subcarrier spacing, the second service cyclic prefix length, and the second service subband on which the second service is located; where that a frame structure of the third service and the frame structure of the second service are different includes:

(1) the third service subband and the second service subband are different; and (2) the third service subcarrier spacing and the second service subcarrier spacing are different, and the third service CP length and the second service CP length are different; or the third service subcarrier spacing and the second service subcarrier spacing are the same, and the third service CP length and the second service CP length are different.

With reference to any one of the sixth aspect, or the first to the sixth possible implementations of the sixth aspect, in a seventh possible implementation of the sixth aspect, the method further includes:

sending, by the second wireless network device, a second channel for common information request to a first wireless network device according to the feature of the second service that needs to be received, where the second channel for common information is delivered based on the request.

With reference to the seventh possible implementation of the sixth aspect, in an eighth possible implementation of the sixth aspect, the second channel for common information request is used to trigger sending the second channel for common information within a time window.

With reference to the seventh or the eighth possible implementation of the sixth aspect, in a ninth possible implementation of the sixth aspect, the second channel for common information request includes an identifier of the second service.

With reference to any one of the seventh to the ninth possible implementations of the sixth aspect, in a tenth possible implementation of the sixth aspect, before the receiving a second channel for common information, the method further includes:

receiving, by the second wireless network device, a first channel for common information, where the first channel for common information and the second channel for common information are transmitted on the same carrier, the first channel for common information is a basic channel for common information, and a structure of the first channel for common information and the structure of the second channel for common information are different.

With reference to the tenth possible implementation of the sixth aspect, in an eleventh possible implementation of the sixth aspect, the structure of the first channel for common information includes a first subcarrier spacing, a first cyclic prefix length, and a first subband on which the first channel for common information is located; and the structure of the second channel for common information includes the second subcarrier spacing, the second cyclic prefix length, and the second subband on which the second channel for common information is located; where that a structure of the first channel for common information and the structure of the second channel for common information are different includes:

(1) the first subcarrier spacing and the second subcarrier spacing are different, and the first CP length and the second CP length are different; or the first subcarrier spacing and the second subcarrier spacing are the same, and the first CP length and the second CP length are different; and (2) the first subband and the second subband are different.

With reference to any one of the sixth aspect, or the first to the eleventh possible implementations of the sixth aspect, in a twelfth possible implementation of the sixth aspect, the method further includes:

receiving, by the second wireless network device, the second channel for common information according to a feature of a fourth service that needs to be received, where the second channel for common information is further corresponding to the fourth service, and the feature of the fourth service includes a frame structure of the fourth service or a type of the fourth service; where the type of the fourth service and the type of the second service are the same; or the frame structure of the fourth service includes a fourth service subcarrier spacing, a fourth service cyclic prefix length, and a fourth service subband on which the fourth service is located; and the frame structure of the second service includes the second service subcarrier spacing, the second service cyclic prefix length, and the second service subband on which the second service is located; where (1) the fourth service subcarrier spacing and the second service subcarrier spacing are the same, and the fourth CP length and the second CP length are the same; or (2) the fourth service subcarrier spacing and the second service subcarrier spacing are the same, the fourth CP length and the second CP length are different, and a time-domain boundary of the last symbol in a subframe in the frame structure of the fourth service is aligned with that of the last symbol in a subframe in the frame structure of the second service.

With reference to the twelfth possible implementation of the sixth aspect, in a thirteenth possible implementation of the sixth aspect, the structure of the second channel for common information includes the second subcarrier spacing, the second cyclic prefix length, and the second subband on which the second channel for common information is located, and that the second channel for common information is further corresponding to the fourth service includes:

(1) the fourth service subcarrier spacing and the second subcarrier spacing are the same, and the fourth service CP length and the second CP length are the same; or the fourth service subcarrier spacing and the second subcarrier spacing are the same, and the fourth service CP length and the second CP length are different; and (2) the second subband and the fourth service subband are different; where optionally, the second common information includes information about the fourth service subband.

In a first possible implementation of the seventh aspect, the wireless network device is a terminal.

The units described as separate parts may or may not be physically separate, and parts displayed as units may or may not be physical units, may be located in one location, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, applied for a wireless network device, the method comprising:

sending first common information in a first subband of a carrier to a terminal device, wherein the first common information comprises a synchronization signal and a broadcast signal; and sending second common information in a second subband of the carrier to the terminal device, wherein the second subband is different from the first subband, and wherein the second common information comprises a synchronization signal, a broadcast signal, and a system message;

wherein the first common information sent to the terminal device comprises information that indicates a frequency offset between a first channel carrying the first common information in the first subband of the carrier and a second channel carrying the second common information in the second subband of the carrier.

2. The method according to claim 1, wherein the frequency offset is indicated by information in a radio resource control (RRC) signaling.

3. The method according to claim 1, wherein the broadcast signal in each of the first common information and the second common information comprises a master information block (MIB) carrying information for an access, and the system message in the second common information comprises a system information block other than an MIB.

4. The method according to claim 1, wherein the second common information is sent according to a request from the terminal device.

5. The method according to claim 1, wherein the synchronization signal in each of the first common information and the second common information comprises a primary synchronization signal and a secondary synchronization signal.

6. The method according to claim 1, wherein the second channel carrying the second common information corresponds to a second service, the first channel carrying the first common information is corresponding to a first service and the feature of the second service comprises a frame structure of the second service, a type of the second service, or a type of the apparatus;

the second channel corresponds to the second service such that the second channel corresponds to one of the following: the frame structure of the second service, the type of the second service, or the type of the apparatus, wherein the frame structure of the second service comprises a second service subcarrier spacing, a second service cyclic prefix length, and a subband on which the second service is located, wherein a structure of the second channel comprises a second subcarrier spacing, a second cyclic prefix length, and a second subband on which the second channel is located, and wherein the feature of the first service comprises a frame structure of the first service, a type of the first service, or a type of the apparatus; and the first channel corresponds to the first service such that the first channel corresponds to one of the following: the frame structure of the first service, the type of the first service, or the type of the apparatus, wherein the frame structure of the first service comprises a first service subcarrier spacing, a first service cyclic prefix length, and a subband on which the first service is located, wherein a structure of the first channel comprises a first subcarrier spacing, a first cyclic prefix length, and a first subband on which the first channel is located, and wherein the feature of the first service is different from the feature of the second service.

7. An apparatus, comprising:

at least one memory storing instructions; and at least one processor configured to execute the instructions stored in the at least one memory to perform:

sending first common information in a first subband of a carrier to a terminal device, wherein the first common information comprises a synchronization signal and a broadcast signal; and sending second common information in a second subband of the carrier to the terminal device, wherein the second subband is different from the first subband, and wherein the second common information comprises a synchronization signal, a broadcast signal, and a system message;

wherein the first common information sent to the terminal device comprises information that indicates a frequency offset between a first channel carrying the first common information in the first subband of the carrier and a second channel carrying the second common information in the second subband of the carrier.

8. The apparatus according to claim 7, wherein the frequency offset is indicated by information in a radio resource control (RRC) signaling.

9. The apparatus according to claim 7, wherein the broadcast signal in each of the first common information and the second common information comprises a master information block (MIB) carrying information for an access.

10. The apparatus according to claim 7, wherein the system message in the second common information comprises a system information block other than a master information block (MIB).

11. The apparatus according to claim 7, wherein the second common information is sent according to a request from the terminal device.

12. The apparatus according to claim 7, wherein the synchronization signal in each of the first common information and the second common information comprises a primary synchronization signal and a secondary synchronization signal.

13. The apparatus according to claim 7, wherein the second channel carrying the second common information corresponds to a second service, the first channel carrying the first common information corresponds to a first service and the feature of the second service comprises a frame structure of the second service, a type of the second service, or a type of the apparatus;

the second channel corresponds to the second service such that the second channel corresponds to one of the following: the frame structure of the second service, the type of the second service, or the type of the apparatus, wherein the frame structure of the second service comprises a second service subcarrier spacing, a second service cyclic prefix length, and a subband on which the second service is located, wherein a structure of the second channel comprises a second subcarrier spacing, a second cyclic prefix length, and a second subband on which the second channel is located, and wherein the feature of the first service comprises a frame structure of the first service, a type of the first service, or a type of the apparatus; and the first channel corresponds to the first service such that the first channel corresponds to one of the following: the frame structure of the first service, the type of the first service, or the type of the apparatus, wherein the frame structure of the first service comprises a first service subcarrier spacing, a first service cyclic prefix length, and a subband on which the first service is located, wherein a structure of the first channel comprises a first subcarrier spacing, a first cyclic prefix length, and a first subband on which the first channel is located, and wherein the feature of the first service is different from the feature of the second service.

14. A non-transitory computer-readable storage medium configured to store instructions that, when executed, cause at least one processor to perform:

sending first common information in a first subband of a carrier to a terminal device, wherein the first common information comprises a synchronization signal and a broadcast signal; and sending second common information in a second subband of the carrier to the terminal device, wherein the second subband is different from the first subband, and wherein the second common information comprises a synchronization signal, a broadcast signal, and a system message;

wherein the first common information sent to the terminal device comprises information that indicates a frequency offset between a first channel carrying the first common information in the first subband of the carrier and a second channel carrying the second common information in the second subband of the carrier.

15. The computer-readable storage medium according to claim 14, wherein the frequency offset is indicated by information in a radio resource control (RRC) signaling.

16. The computer-readable storage medium according to claim 14, wherein the broadcast signal in each of the first common information and the second common information comprises a master information block (MIB) carrying information for an access, and the system message in the second common information comprises a system information block other than an MIB.

17. The computer-readable storage medium according to claim 14, wherein the second common information is sent according to a request from the terminal device.

18. The computer-readable storage medium according to claim 14, wherein the synchronization signal in each of the first common information and the second common information comprises a primary synchronization signal and a secondary synchronization signal.

* * * * *

UNITED STATES PATENT AND TRADEMARK OFFICE

CERTIFICATE OF CORRECTION

PATENT NO. : 10,764,886 B2
APPLICATION NO. : 15/863476
DATED : September 1, 2020
INVENTOR(S) : Li et al.

It is certified that error appears in the above-identified patent and that said Letters Patent is hereby corrected as shown below:

On the Title Page

On Page 2, Column 2, Line 6, Reference Cited, Other Publications:
“CB 201580081516.6,” should read -- CN 201580081516.6, --.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*